(12) United States Patent
Tavshikar

(10) Patent No.: US 10,661,902 B1
(45) Date of Patent: May 26, 2020

(54) ARTIFICIAL INTELLIGENCE SYSTEM FOR ESTIMATING EXCESS NON-SAPIENT PAYLOAD CAPACITY ON MIXED-PAYLOAD AERONAUTIC EXCURSIONS

(71) Applicant: QuantumID Technologies Inc, Cambridge, MA (US)

(72) Inventor: Milind Tavshikar, Lexington, MA (US)

( * ) Notice: Subject to any disclaimer, the term of this patent is extended or adjusted under 35 U.S.C. 154(b) by 0 days.

(21) Appl. No.: 16/369,892

(22) Filed: Mar. 29, 2019

(51) Int. Cl.
| | |
|---|---|
| *B64D 11/00* | (2006.01) |
| *G06N 5/04* | (2006.01) |
| *G06N 20/00* | (2019.01) |
| *G07C 5/00* | (2006.01) |

(52) U.S. Cl.
CPC ............ *B64D 11/00* (2013.01); *G06N 5/046* (2013.01); *G06N 20/00* (2019.01); *G07C 5/008* (2013.01)

(58) Field of Classification Search
CPC ........ B64D 11/00; G07C 5/008; G06N 5/046; G06N 20/00
See application file for complete search history.

(56) References Cited

U.S. PATENT DOCUMENTS

| | | | | |
|---|---|---|---|---|
| 7,430,518 | B2 * | 9/2008 | Gliozzi ................. | G06Q 10/02 705/5 |
| 2007/0255489 | A1 * | 11/2007 | Jensen ................... | G01G 19/07 701/124 |
| 2017/0045394 | A1 | 2/2017 | Fuss et al. | |
| 2018/0060808 | A1 * | 3/2018 | Borgerson ............. | G06Q 40/04 |
| 2018/0209837 | A1 * | 7/2018 | Golshany ............... | G01G 19/07 |

OTHER PUBLICATIONS

Koev, Transmetrics: The Startup That Helps Cargo Companies Stop Shipping Air, Interview, Sep. 21, 2018.

* cited by examiner

*Primary Examiner* — Alan D Hutchinson
(74) *Attorney, Agent, or Firm* — Caldwell Intellectual Property Law

(57) ABSTRACT

An artificial intelligence system for estimating excess non-sapient payload capacity on mixed-payload aeronautic excursions includes at least a server that produces a corpus of aeronautic excursion data, from data that may be received via one or more data feeds. The at least a server is designed and configured to receive at least an aeronautic excursion parameter regarding a future mixed-payload aeronautic excursion. The at least a server is designed and configured to output an excess non-sapient payload storage estimation based on the at least an aeronautic excursion parameter. The system includes a capacity estimation artificial intelligence module operating on the at least a server, the capacity estimation artificial intelligence module designed and configured to generate the excess non-sapient payload storage estimation as a function of the corpus of aeronautic excursion data and the at least an aeronautic excursion parameter.

20 Claims, 15 Drawing Sheets

US 10,661,902 B1

ARTIFICIAL INTELLIGENCE SYSTEM FOR ESTIMATING EXCESS NON-SAPIENT PAYLOAD CAPACITY ON MIXED-PAYLOAD AERONAUTIC EXCURSIONS

FIELD OF THE INVENTION

The present invention generally relates to the field of artificial intelligence. In particular, the present invention is directed to artificial intelligence system for estimating excess non-sapient payload capacity on mixed-payload aeronautic excursions.

BACKGROUND

Mixed-payload aeronautic excursions frequently carry different classes of payload in different sections or components of aircraft. Where sapient payload is combined with associated non-sapient payload, a section for the latter may be left with excess capacity, which could be used to store additional non-sapient payload. However, this excess capacity is difficult to predict and existing systems for such estimation are inaccurate.

SUMMARY OF THE DISCLOSURE

In an aspect, an artificial intelligence system for estimating excess non-sapient payload capacity on mixed-payload aeronautic excursions includes at least a server. The at least a server is designed and configured to produce a corpus of aeronautic excursion data including a plurality of aeronautic excursion data entries, wherein each aeronautic excursion data entry correlates at least a first aeronautic excursion parameter datum and at least a second aeronautic excursion parameter datum. The at least a server is designed and configured to receive at least an aeronautic excursion parameter regarding a future mixed-payload aeronautic excursion. The at least a server is designed and configured to output an excess non-sapient payload storage estimation based on the at least an aeronautic excursion parameter. The system includes a capacity estimation artificial intelligence module operating on the at least a server, the capacity estimation artificial intelligence module designed and configured to generate the excess non-sapient payload storage estimation as a function of the corpus of aeronautic excursion data and the at least an aeronautic excursion parameter.

In another aspect, an artificial intelligence method of estimating excess non-sapient payload capacity on mixed-payload aeronautic excursions includes producing, by at least a server, a corpus of aeronautic excursion data including a plurality of aeronautic excursion data entries, wherein each aeronautic excursion data entry correlates at least a first aeronautic excursion parameter datum and at least a second aeronautic excursion parameter datum. The method includes receiving, by the server, at least an aeronautic excursion parameter regarding at least a future mixed-payload aeronautic excursion. The method includes generating, by a capacity estimation artificial intelligence module operating on the at least a server, an excess non-sapient payload storage estimation as a function of the corpus of aeronautic excursion data and the at least an aeronautic excursion parameter. The method includes outputting, by the server, the excess non-sapient payload storage estimation based on the at least an aeronautic excursion parameter.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments of disclosed systems and methods use artificial intelligence to generate modules that determine excess non-sapient payload capacity in mixed-payload aeronautic excursions. Resulting determinations may be used to estimate excess non-sapient payload capacity on future mixed-payload aeronautic excursions. Data used to perform learning algorithms may be provided in one or more databases, received via data feeds from operators, airports, and/or weather services. Estimations may continually update in response to updated data.

Figure 1:
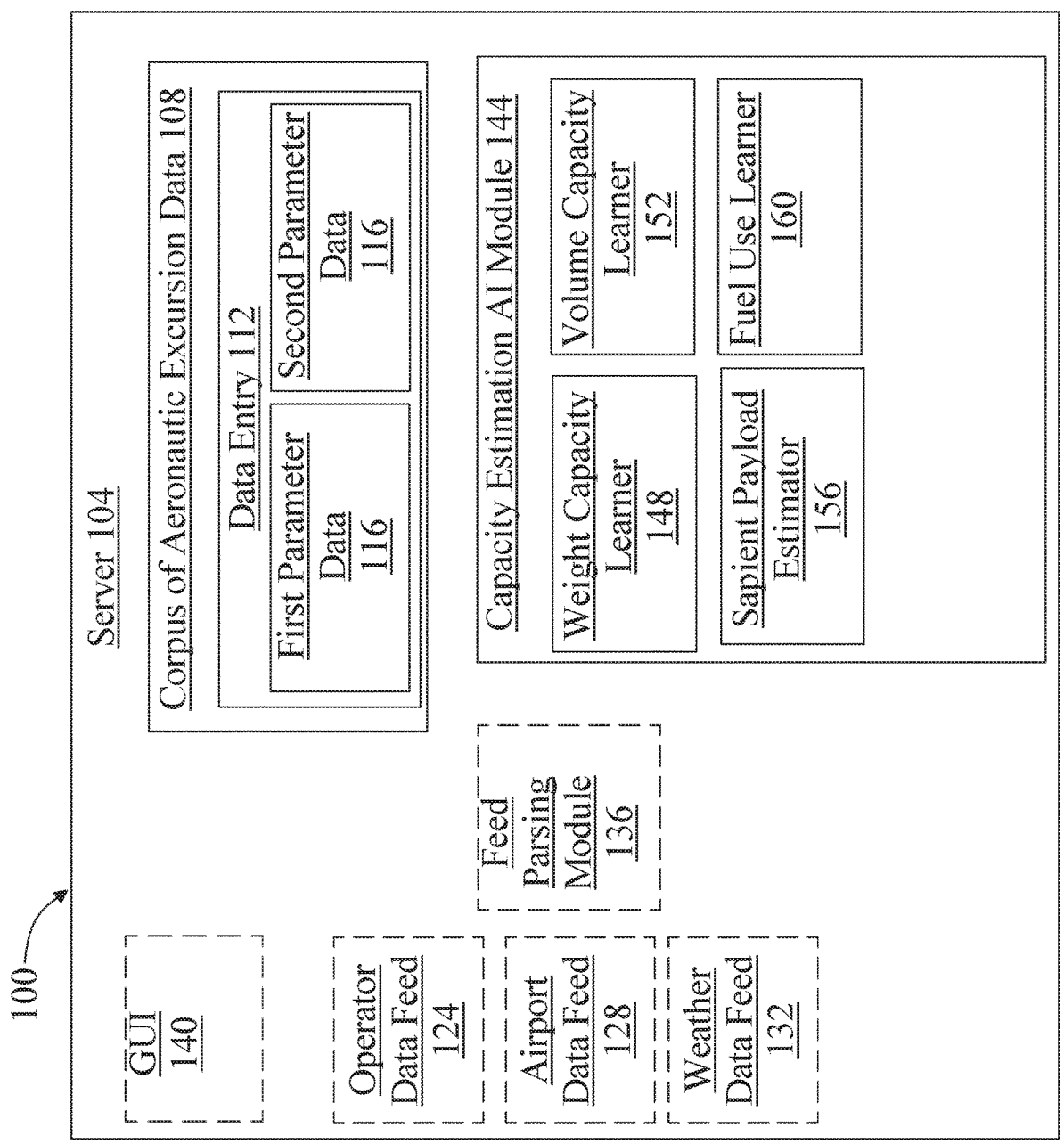
FIG. 1 is a block diagram illustrating an exemplary embodiment an artificial intelligence system for estimating excess non-sapient payload capacity on mixed-payload aeronautic excursions.

Referring to FIG. 1, an exemplary embodiment of an artificial intelligence system 100 for predicting excess cargo capacity on passenger flights is illustrated estimating excess non-sapient payload capacity on mixed-payload aeronautic excursions is illustrated. System 100 includes at least a server 104. At least a server 104 may include any computing device as described below in reference to FIG. 15, including without limitation a microcontroller, microprocessor, digital signal processor (DSP) and/or system on a chip (SoC) as described below in reference to FIG. 15. At least a server 104 may be housed with, may be incorporated in, or may incorporate one or more sensors of at least a sensor. Computing device may include, be included in, and/or communicate with a mobile device such as a mobile telephone or smartphone. At least a server 104 may include a single computing device operating independently, or may include two or more computing device operating in concert, in parallel, sequentially or the like; two or more computing devices may be included together in a single computing device or in two or more computing devices. At least a server 104 with one or more additional devices as described below in further detail via a network interface device. Network interface device may be utilized for connecting a at least a server 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a server 104 may include but is not limited to, for example, a at least a server 104 or cluster of computing devices in a first location and a second computing device or cluster of computing devices in a second location. At least a server 104 may include one or more computing devices dedicated to data storage, security, distribution of traffic for load balancing, and the like. At least a server 104 may distribute one or more computing tasks as described below across a plurality of computing devices of computing device, which may operate in parallel, in series, redundantly, or in any other manner used for distribution of tasks or memory between computing devices. At least a server 104 may be implemented using a "shared nothing" architecture in which data is cached at the worker, in an embodiment, this may enable scalability of system 100 and/or computing device.

Still referring to FIG. 1, at least a server 104 is designed and configured to produce a corpus of aeronautic excursion data 108. At least a corpus of aeronautic excursion data 108 may include at least a corpus of training data. Training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of a medical condition or therapy may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

With continued reference to FIG. 1, at least a corpus of aeronautic excursion data 108 includes a plurality of aeronautic excursion data entries. Each data entry of plurality of aeronautic excursion data entries may include data pertaining to an aeronautic excursion, which as used in this disclosure may include any trip or voyage taken using an aircraft. Aircraft may include, without limitation, a fixed-wing aircraft such as an airplane, a rotor-based aircraft such as a helicopter or autogiro, a lighter-than-air aircraft such as blimp or dirigible, or any other vehicle used to transport persons and/or good through the air. Aeronautic excursion data may include data concerning mixed-payload aeronautic excursions. As used herein, a mixed-payload aeronautic excursion is an aeronautic excursion in which a payload, defined as anything carried on the aircraft besides the aircraft itself, materials used or usable for maintaining flight, or flight crew such as pilots, co-pilots, flight attendants, security personnel, or the like, includes both sapient payload and non-sapient payload. Sapient payload may include a number of persons transported on the aircraft besides flight crew such as pilots, co-pilots, flight attendants, security personnel, or the like; sapient payload may include, for instance, patients being transported for medical purposes. Sapient payload may include prisoners being transported from one facility to another. Sapient payload may include one or more persons that have arranged to travel on an aircraft for an aeronautic excursion; one or more persons may be travelling for business, pleasure, governmental functions, or the like. One or more persons may include one or more persons that have obtained a right of passage on the aircraft for the aeronautic excursion by remunerative means, for instance by providing currency, electronic payment, drafts, or the like to an operator of the aircraft; one or more persons may be passengers.

Still referring to FIG. 1, non-sapient payload may include a quantity or number of elements of payload, as defined above, that are not sapient payload. For instance, and without limitation, non-sapient payload may include inanimate objects, non-human living organisms such as animals, plants, or the like, materials such as construction materials, or any other item or items of payload that may be transported on an aircraft for an aeronautic excursion. Non-sapient payload may be expressed as a number of items, a volume occupied by a single item or in the aggregate by a plurality of items including without limitation the set of all items to be transported on the aircraft for at least a portion of the aeronautic excursion, a weight of a single item, a weight of a plurality of items including without limitation the set of all items to be transported on the aircraft for at least a portion of the aeronautic excursion, or any combination thereof. Non-limiting examples of non-sapient payload may include elements of non-sapient payload carried by one or more persons making up sapient payload, including without limitation suitcases, "carry-on" bags, backpacks, parcels, crates, chests, or the like and/or one or more elements of freight as described in further detail below.

With continued reference to FIG. 1, each aeronautic excursion data entry 112 correlates at least a first aeronautic excursion parameter datum 116 and at least a second aeronautic excursion parameter datum 120. As used in this disclosure, an aeronautic excursion parameter datum is any element of data including any facet of an aeronautic excursion. An aeronautic excursion parameter datum may include any data that was provided prior to an aeronautic excursion; for instance, and without limitation, aeronautic excursion parameter datum may include without limitation data included in a load distribution message (LDM), data contained in a container pallet message (CPM), fuel message, flight plan information including distance to be traveled, number of stops and/or layovers, an origin airport, a destination airport, a flight path to be followed, one or more dates and/or times including times of departure, arrival, layovers, or the like, a time of day that an aeronautic excursion was intended to occupy, and/or a planned duration of flight.

Continuing to refer to FIG. 1, an aeronautic excursion parameter datum may include any data concerning and/or describing an aircraft used in an aeronautic excursion, including without limitation data identifying an entity and/or person operating the aeronautic excursion, such as an airline company and/or owner, pilots crew, maintenance, cleaning, luggage handling, and/or repair personnel at any airport, security personnel on the aircraft of at any airport, an identifier identifying the aeronautic excursion such as a "flight ID," a variety of aircraft undertaking the aeronautic excursion, including without limitation a make, model, manufacturer, or the like, a date of manufacture, a lot of manufacture, a number of years of use and/or operation of the aircraft, a number representing total flying time the aircraft had undergone as of the beginning of the aeronautic excursion, one or more numbers representing an amount of flying time undergone by an aircraft per unit of time such as a decade, year, month, week, or day, and/or maintenance history, including without limitation history of repairs, replacement of parts or components, incidents requiring grounding, emergency landing, diversion, or repairs, or the like. Aircraft data may also include compartment data; for instance, an aircraft used in mixed-payload aeronautic excursions may have a fuselage divided into, for instance, a compartment with seating for persons, a compartment for transport of non-sapient payload items, including without limitation a "luggage compartment," and/or one or more additional compartments used for non-sapient payload items, such as "carry-on" stowage locations.

Still referring to FIG. 1, an aeronautic excursion parameter datum may include, without limitation, aeronautic excursion circumstances data, which may include any information concerning circumstances of aeronautic excursion external to an aircraft; such data may include without limitation information describing weather reports in areas traversed during the aeronautic excursion, weather forecasts in areas traversed during the aeronautic excursion, geographical data concerning areas traversed during the aeronautic excursion, a season during which the aeronautic excursion took place, a calendar date on which the aeronautic excursion took place, a time of day during which the aeronautic excursion took place, a degree of congestion at one or more airports from which the aircraft departed and/or at which the aircraft arrived during the aeronautic excursion, or the like.

Continuing to refer to FIG. 1, an aeronautic excursion parameter datum may include, without limitation, aeronautic excursion data, which may be any data describing how an aeronautic excursion took place. Aeronautic excursion data may include, without limitation, information describing an actual flight plan followed, including distance that was traveled, number of stops and/or layovers that took place, actual origin airport, actual destination airport, an actual flight path that was traversed, one or more actual dates and/or times including times of departure, arrival, actual layovers, a time of day that an aeronautic excursion occupied, actual duration of the aeronautic excursion, flight delay information, landing delay information, passenger feedback, and/or data describing state of non-sapient payload items upon arrival.

Still referring to FIG. 1, an aeronautic excursion parameter datum may include aeronautic excursion communication data, which is defined as data describing electronic communication performed during an aeronautic excursion. Aeronautic excursion communication data may include, without limitation, communication logs describing communications between pilots and other entities and/or persons such as without limitation air traffic controllers. Aeronautic excursion communication data may include without limitation transponder-based communication. Aeronautic excursion communication data may include automated dependent surveillance-broadcast (ADS-B) data including ADS-B-In or ADS-B-Out data. Aeronautic excursion communication data may include flight recorder data. Generally, aeronautic excursion parameter datum may include any other example of aeronautic excursion parameter data described or alluded to in this disclosure, as well as any other example or examples that may occur to a person of ordinary skill in the art upon reviewing the entirety of this disclosure.

Continuing to refer to FIG. 1, an aeronautic excursion parameter datum may include, without limitation, sapient payload data. Sapient payload data may include, without limitation, any information concerning persons making up sapient payload, including individual body weights, average body weights, and/or total body weight, demographic information such as individual ages, average ages, countries, provinces, territories, departments, and/or municipalities of origin, frequency of travel, purpose of travel, or the like. Sapient payload data may be linked to non-sapient payload data as described in further detail below; for instance, sapient payload data may include data describing amounts of non-sapient payload brought onto an aircraft by one or more persons, and/or an aggregated total of non-sapient data brought onto the aircraft by all persons represented by sapient payload data.

Still referring to FIG. 1, an aeronautic excursion parameter datum may include, without limitation, non-sapient payload data. Non-sapient payload data may include, without limitation, any information concerning items making up non-sapient payload, individual weights of items, average weights of items, and/or total weight of all non-sapient payload. Non-sapient payload data may include, without limitation, individual volumes of items, volumes of storage taken up by individual items, average volumes of items, average volumes of storage space taken up by items, total volume of all non-sapient payload, and/or total volume of storage space taken up by non-sapient payload. Non-sapient payload data may be linked to sapient payload data as described in further detail below; for instance, non-sapient payload data may include data describing amounts of non-sapient payload brought onto an aircraft by one or more persons, and/or an aggregated total of non-sapient data brought onto the aircraft by all persons represented by sapient payload data.

Figure 2:
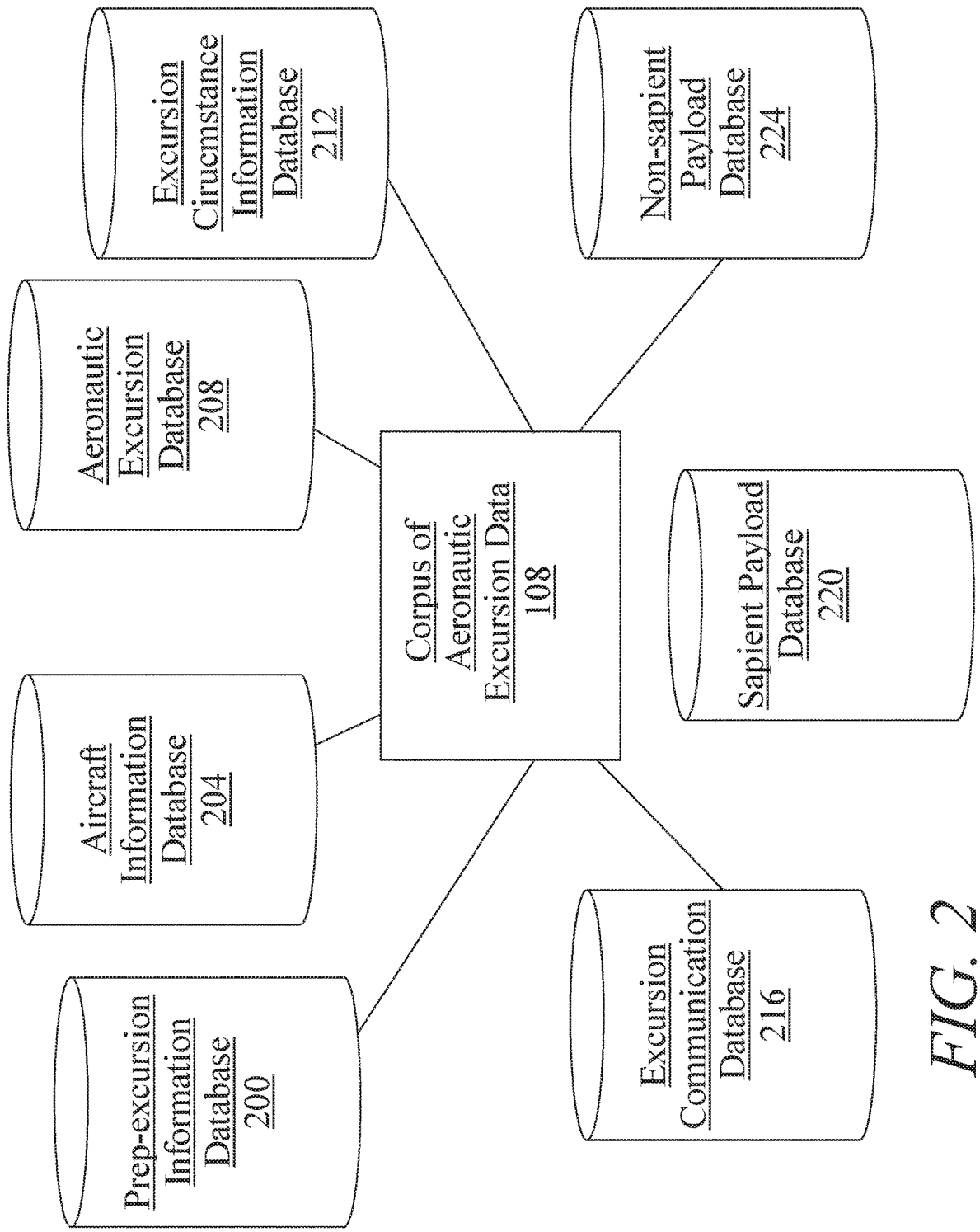
FIG. 2 is a block diagram illustrating exemplary embodiments of databases that may be used to produce training data.

Referring now to FIG. 2, data incorporated in corpus of aeronautic excursion data 108 may be incorporated in one or more databases. As a non-limiting example, one or more elements of pre-excursion information may be stored in and/or retrieved from a pre-excursion information database 200. A pre-excursion information database 200 may include any data structure for ordered storage and retrieval of data, which may be implemented as a hardware or software module. A pre-excursion information database 200 may be implemented, without limitation, as a relational database, a key-value retrieval datastore such as a NOSQL database, or any other format or structure for use as a datastore that a person skilled in the art would recognize as suitable upon review of the entirety of this disclosure. Pre-excursion information database 200 may include, without limitation, any data that was provided prior to an aeronautic excursion as described above.

Figure 3:
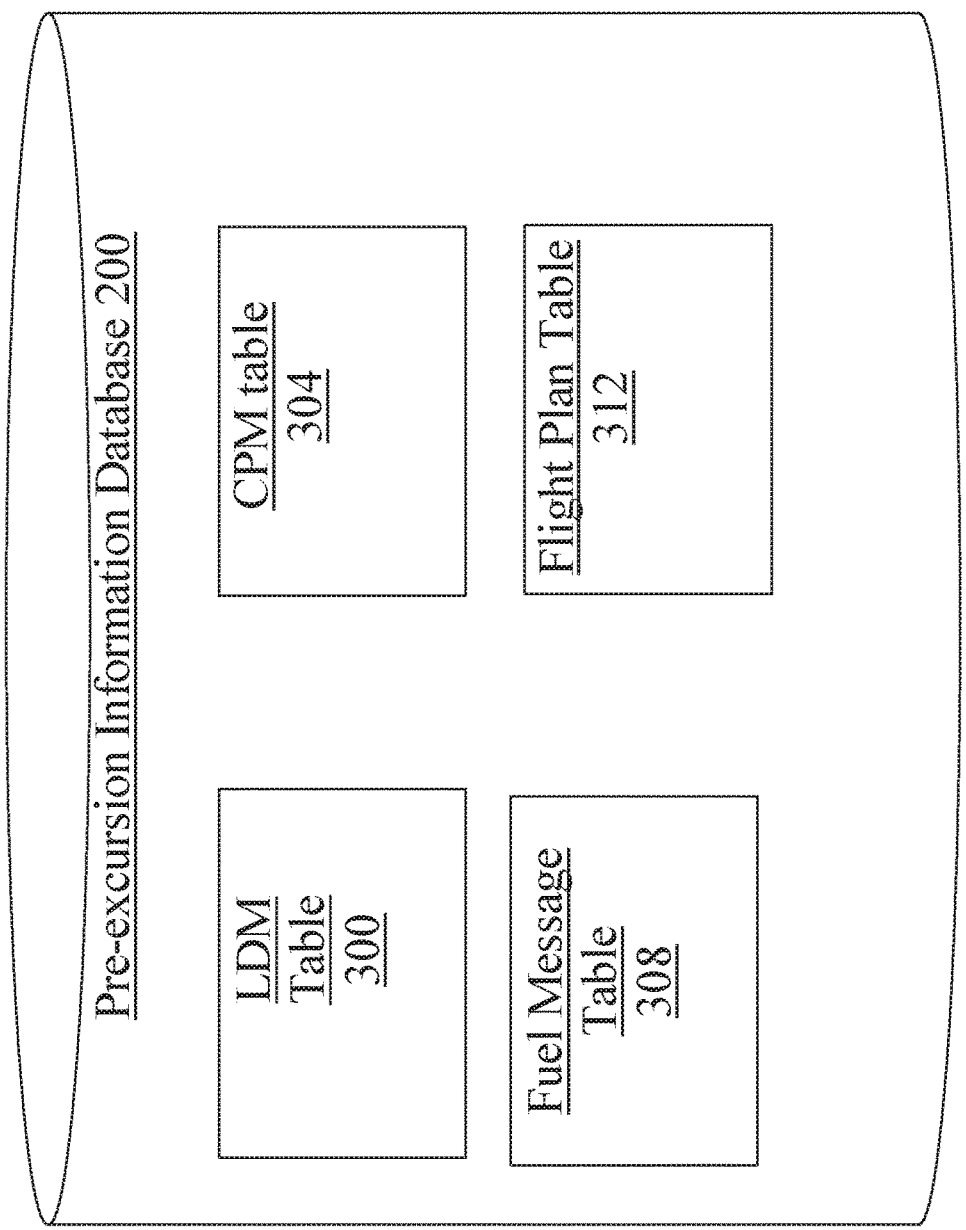
FIG. 3 is a block diagram of an exemplary embodiment of a pre-excursion information database.

Referring now to FIG. 3, one or more database tables in pre-excursion information database 200 may include, as a non-limiting example an LDM table 300 listing LDM information as described above. One or more tables may include a CPM table 304 listing CPM data as described above. One or more tables may include a fuel message table 308, which may list fuel message data as described above. One or more tables may include flight plan table 312 listing flight plan information as described above.

Referring again to FIG. 2, one or more elements of aircraft data may be stored in and/or retrieved from an aircraft information database 204.

Figure 4:
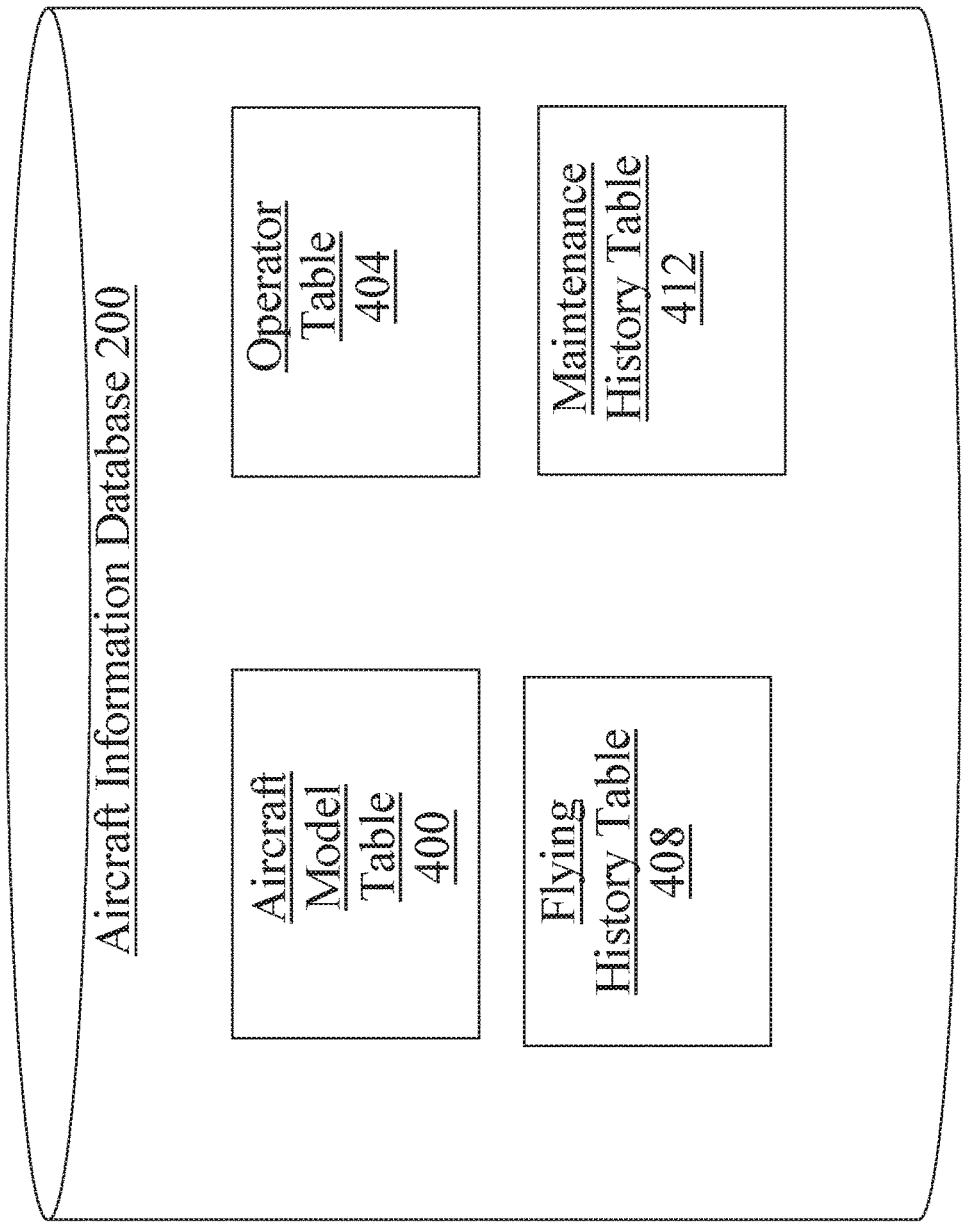
FIG. 4 is a block diagram of an exemplary embodiment of an aircraft information database.

Referring now to FIG. 4, one or more database tables in aircraft information database 204 may include, as a non-limiting example an aircraft model table 400, which may describe a make and model of an aircraft. One or more tables may include an operator table 404, which may describe, without limitation, entities, pilots, and crew operating the aircraft, as described above. One or more tables may include a flying history table 408, which may describe flying time, number of aeronautic excursions, and/or other data concerning flight history of an aircraft. One or more tables may include a maintenance history table 412, which may describe a history of maintenance as described above.

Referring again to FIG. 2, one or more elements of aeronautic excursion data as described above may be stored in and/or retrieved from an aeronautic excursion information database 208.

Figure 5:
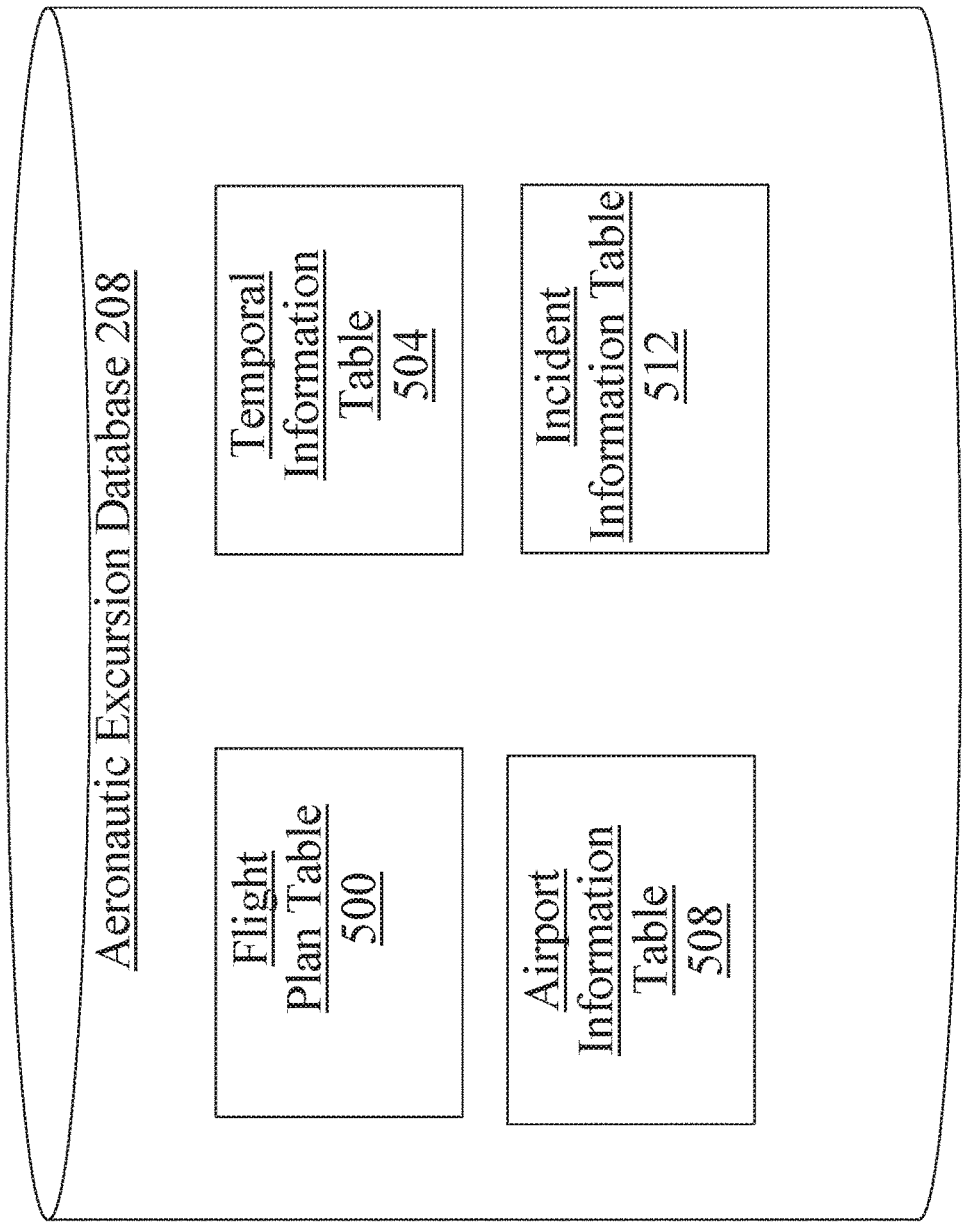
FIG. 5 is a block diagram of an exemplary embodiment of an aeronautic excursion database.

Referring now to FIG. 5, one or more database tables in aeronautic excursion information database 208 may include, as a non-limiting example, a flight plan table 500, which may list flight plan information actually followed during an aeronautic excursion, a temporal information table 504 listing dates and times an aeronautic excursion took place, an airport information table 508 listing origin and arrival airports, and an incident information table 512, which may list, without limitation, flight delays, landing delays, passenger feedback, and/or other incidents.

Referring again to FIG. 2, one or more elements of excursion circumstance data may be stored in and/or retrieved from an excursion circumstance information database 212.

Figure 6:
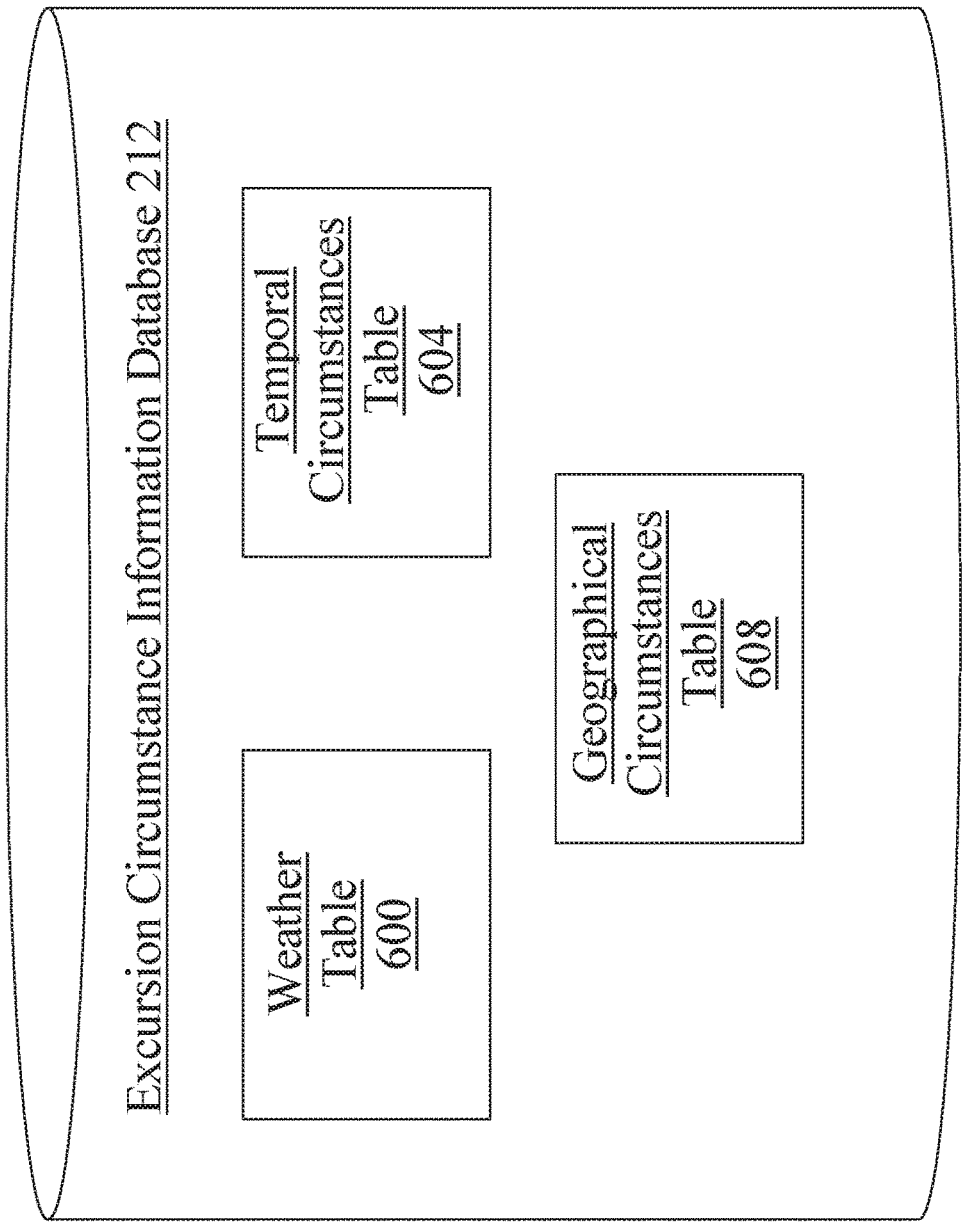
FIG. 6 is a block diagram of an exemplary embodiment of an excursion circumstance information database.

Referring now to FIG. 6, one or more database tables in excursion circumstance information database 212 may include, as a non-limiting example a weather table 600 listing weather conditions at the time of the aeronautic excursion. One or more tables may include a temporal circumstances table 604, which may list a season, time of day, date, time, or other temporal attribute of the aeronautic excursion or one or more portions thereof. One or more tables may include a geographical circumstances table 608 listing one or more geographical circumstances of an aeronautic excursion as described above.

Referring again to FIG. 2, one or more elements of excursion communication data may be stored in and/or retrieved from an excursion communication database 216.

Figure 7:
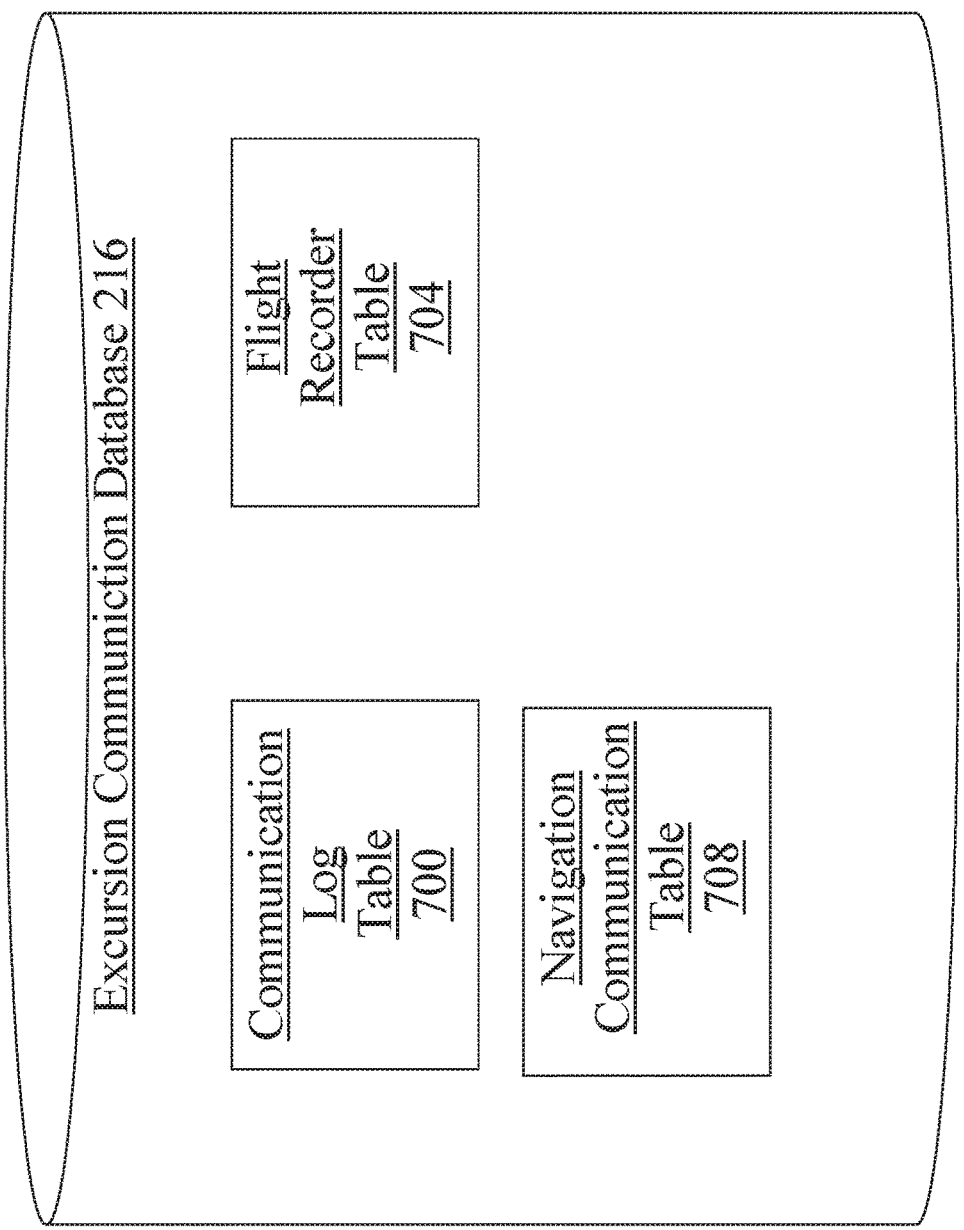
FIG. 7 is a block diagram of an exemplary embodiment of an excursion communication database.

Referring now to FIG. 7, one or more database tables in excursion communication database 216 may include, as a non-limiting example may include a communication log table 700 listing or containing logs of communication between aircraft crew and other entities. One or more tables may include a flight recorder table 704 listing flight recorder information. One or more tables may include a navigation communication table 708 listing transponder, ADS-B, or other data used to convey navigation information from and/or to an aircraft.

Referring again to FIG. 2, one or more elements of sapient payload data may be stored in and/or retrieved from sapient payload database 220.

Figure 8:
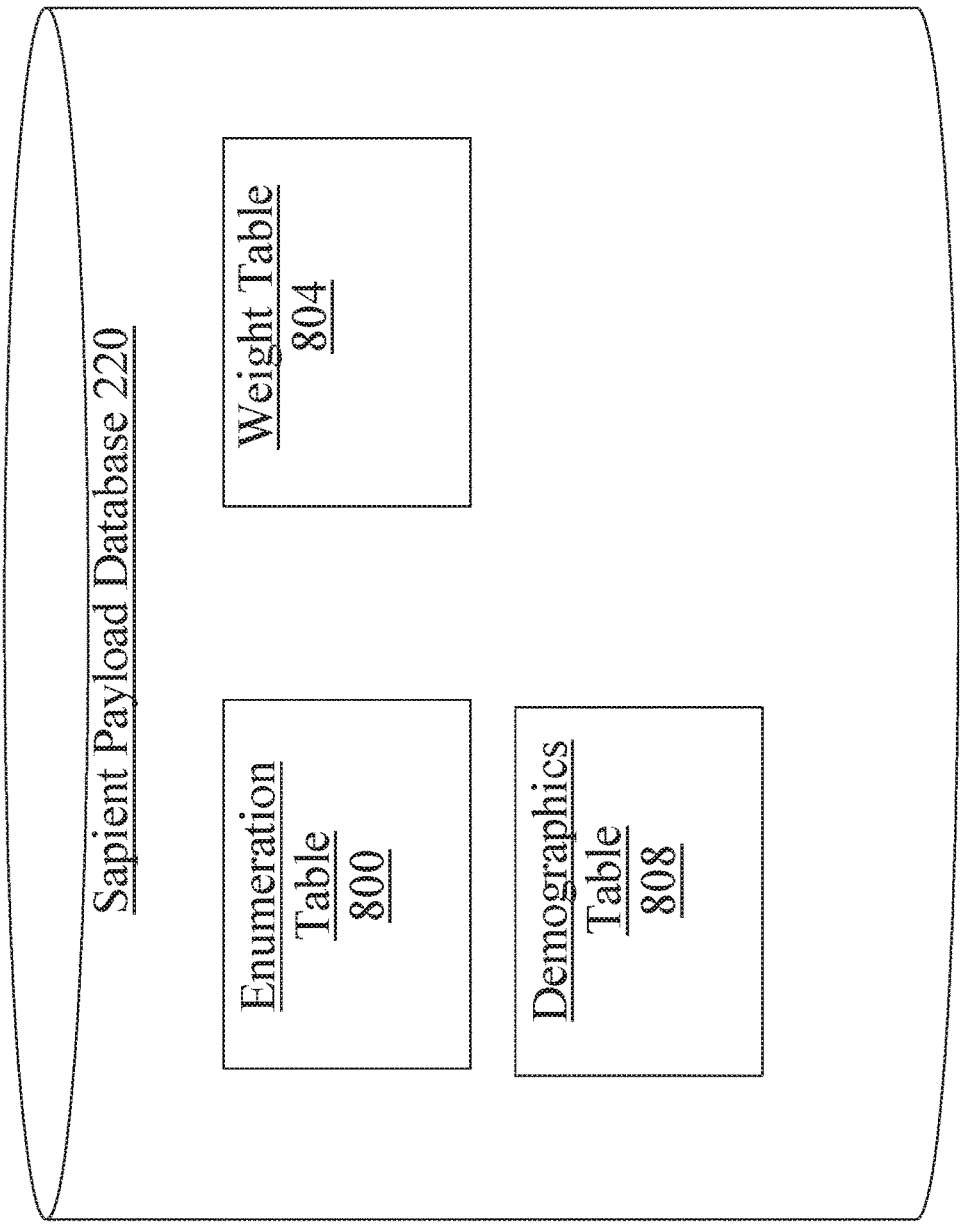
FIG. 8 is a block diagram of an exemplary embodiment of a sapient payload database.

Referring now to FIG. 8, one or more database tables in sapient payload database 220 may include, as a non-limiting example an enumeration table 800, which may list an enumeration of sapient payload as described above. One or more tables may include a weight table 804, which may list any or all weights of sapient payload, including average weight per person, total weight, and the like. One or more tables may include a demographics table 808, which may list any demographic information as described above.

Referring again to FIG. 2, one or more elements of non-sapient payload data may be stored in and/or retrieved from a non-sapient payload database 220

Figure 9:
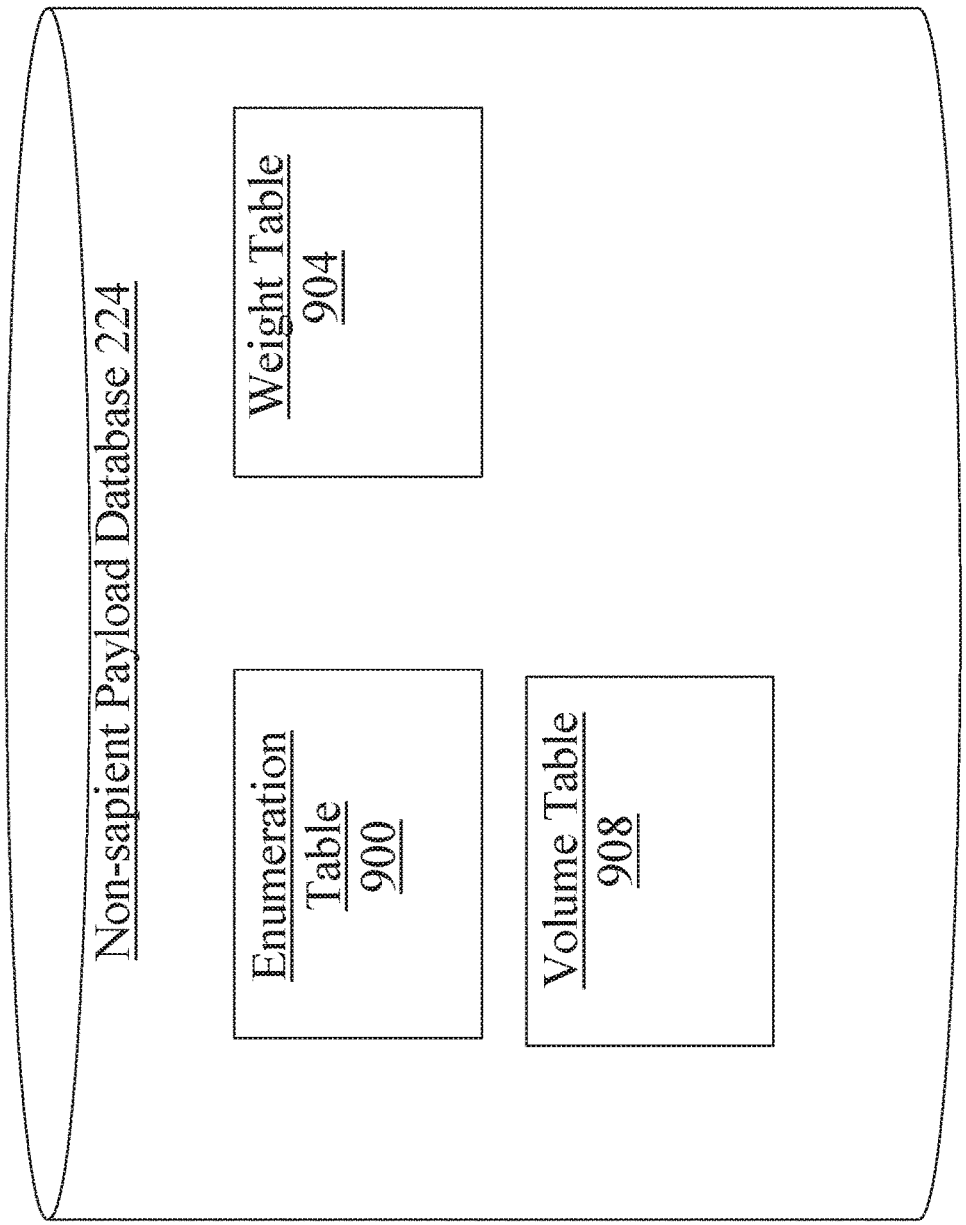
FIG. 9 is a block diagram of an exemplary embodiment of a non-sapient payload database.

Referring now to FIG. 9, one or more database tables in non-sapient payload database 220 may include, as a non-limiting example, an enumeration table 900, which may list an enumeration of non-sapient payload as described above. One or more tables may include a weight table 904, which may list any or all weights of non-sapient payload, including average weight per item, total weight, and the like. One or more tables may include a volume table 908, which may list total volume and/or volume per item of non-sapient payload.

Referring again to FIG. 1, at least a server 104 may be configured to produce the corpus of mixed payload aeronautic excursion data by producing a plurality of sapient payload-to-weight entries, each sapient payload-to-weight entry of the plurality of sapient payload-to-weight entries correlating a number of mixed payloads to a non-sapient payload weight factor. This may be accomplished, without limitation, by retrieving linked and/or associated data from databases as described above in reference to FIG. 2; for instance, at least a server 104 may assemble a training set of corpus of aeronautic excursion data 108 by executing a query at one or more databases to retrieve at least a first excursion parameter datum and correlated at least a second excursion parameter datum. Alternatively or additionally, data feeds may be used to acquire aeronautic excursion data entries. For instance, and without limitation, an operator data feed 124 may receive streamed or discrete-message data from entities operating aircraft, which may include, without limitation, pre-excursion data, aircraft data, aeronautic excursion circumstance data, aeronautic excursion data, excursion communication data, sapient payload data, and/or non-sapient payload data for each aeronautic excursion. As a further non-limiting example, an airport data feed 128 may receive streamed or discrete-message data from airports, traffic controllers, or the like; received data may include, without limitation, pre-excursion data, aircraft data, aeronautic excursion circumstance data, aeronautic excursion data, excursion communication data, sapient payload data, and/or non-sapient payload data for each aeronautic excursion. As an additional non-limiting example, a weather data feed 132 may provide receive streamed or discrete-message flight circumstances data concerning weather; weather data feed 132 may receive information from a weather forecasting and/or reporting service such as, in an non-limiting example, WEATHER.COM as operated by The Weather Company, LLC of Atlanta Ga., and/or weather feeds from the National Oceanographic and Atmospheric Administration (NOAA).

Still referring to FIG. 1, system 100 may include a feed parsing module 136, which may categorize and format data for use in corpus of aeronautic excursion data 108, creation of training sets included in corpus of aeronautic excursion data 108, and/or for placement in databases as described above in reference to FIG. 2. Data in feeds may be received in a standardized form, including without limitation a fixed-length textual field form, a comma-separated value (CSV) form, or in a self-describing format such as without limitation extensible markup language (XML); feed parsing module 136 may be configured to place standardized fields in associated variables, which may be interconnected via references, pointers, or inclusion in common data structures or hierarchies thereof to preserve existing correlations in data as provided in feeds. Alternatively or additionally, feed parsing module 136 may tokenize or otherwise separate and analyze data that is in non-standard formats to sort it into such variables, data structures, and/or hierarchies of data structures. Feed parsing module 136 may be configured to link data from disparate feeds together using variables data structures, and/or hierarchies of data structures. Linking may be performed using common data; for instance, where operator data feed 124 and airport data feed 128 each provide records pertaining to a particular identifier of an aeronautic excursion, or to a particular and uniquely identifiable carrier, destination, departure, date, and/or time combination, feed parsing module 136 may be configured to match the linking data and combine data concerning the same aeronautic excursion from the two feeds together. As a further example, feed parsing module 136 may match up weather forecast and/or reporting data from weather data feed 132 with data acquired from operator data feed 124 and/or airport data feed 128 by matching date, time, and location information to link aeronautic excursion data up with circumstances data describing forecasted and actual weather conditions.

With continued reference to FIG. 1, production of corpus of aeronautic excursion data 108 may include production of training sets correlating at least a first aeronautic excursion parameter datum 116 and at least a second aeronautic excursion parameter datum 120. There may be a single such training set or a plurality thereof. As a non-limiting example, at least a server 104 may be configured to produce the corpus of mixed payload aeronautic excursion data by producing a plurality of sapient payload-to-weight entries, each sapient payload-to-weight entry of the plurality of sapient payload-to-weight entries correlating at least an aeronautic excursion parameter datum to a sapient payload weight datum, where a sapient payload weight datum may include any datum corresponding to a partial or total weight of sapient payload, including without limitation a total weight of sapient payload, an average weight per person, or the like. As a further non-limiting example, at least a server 104 may be configured to produce the corpus of aeronautic excursion data 108 by producing a plurality of sapient payload enumeration entries, each sapient payload enumeration entry of the plurality of sapient payload enumeration entries correlating at least an aeronautic excursion parameter datum to a sapient payload enumeration on an aeronautic excursion, where a sapient payload enumeration represents a number of persons making up a sapient payload on the aeronautic excursion; enumeration may further include enumerations by category such as an enumeration of persons in one passenger class and an enumeration of persons in another passenger class.

Still referring to FIG. 1, and as a further non-limiting example, at least a server 104 may be configured to produce the corpus of aeronautic excursion data 108 by producing a plurality of non-sapient payload-to-weight entries, each non-sapient payload-to-weight entry of the plurality of sapient payload-to-weight entries correlating at least an aeronautic excursion parameter datum to a non-sapient payload weight datum, where a non-sapient payload weight datum may include any datum corresponding to a partial or total weight of non-sapient payload, including without limitation a total weight of non-sapient payload, an average weight per item of non-sapient payload, or the like. As a further non-limiting example, at least a server 104 may be configured to produce the corpus of aeronautic excursion data 108 by producing a plurality of non-sapient payload-to-volume entries, each non-sapient payload-to-volume entry of the plurality of sapient payload-to-weight entries correlating at least an aeronautic excursion parameter datum to non-sapient payload volume datum, where a non-sapient payload volume datum may include any datum corresponding to a partial or total volume of non-sapient payload, including without limitation a total volume of non-sapient payload, a total volume of storage space occupied by non-sapient payload, a total volume of a specific compartment or storage area occupied by non-sapient payload, an average volume per item of non-sapient payload, or the like. This data may, as a non-limiting example, be tracking a likelihood that a projected enumeration may increase or decrease, for instance because of persons switching from one aeronautic excursion to another, being reassigned to an aeronautic excursion owing to weather delays, or the like.

With continued reference to FIG. 1, at least a server 104 may be configured to produce the corpus of aeronautic excursion data 108 by producing a plurality of fuel use entries, each fuel use entry of the plurality of fuel use entries correlating at least an aeronautic excursion parameter datum to a fuel use datum, where a fuel consumption datum is an element of data that describes a rate or quantity of fuel consumption. As a non-limiting example, training data may correlate fuel consumption rates to weather conditions, particular flight paths, particular airports (such as, without limitation, airports more likely to impose significant landing delays), or the like. Persons skilled in the art, upon reviewing the entirety of this disclosure, will be aware of various additional training sets containing various additional correlations which may be used and/or produced consistently with this disclosure.

Continuing to refer to FIG. 1, at least a server 104 is configured to receive at least an aeronautic excursion parameter regarding a future aeronautic excursion. At least an aeronautic excursion parameter may be received by any suitable means, including without limitation receipt via operator data feed 124, airport data feed 128, and/or weather data feed 132, or a combination thereof, as described above. As a non-limiting example, at least an aeronautic excursion parameter may include an identifier of an aeronautic excursion, a departure location, a projected time of departure, a destination, and the like as provided by an airport data feed 128. An operator data feed 124 may indicate a current enumeration of sapient payload and may also indicate a current level of non-sapient payload, including without limitation luggage and/or carry-on items that persons in the projected sapient payload have indicated they will bring. A weather data feed 132 may provide current weather information as well as forecast data indicating likely weather conditions at the time of the aeronautic excursion. At least a server 104 may combine and/or categories this information, for instance using feed parsing module 136, so as to provide it to further modules as described below. In an embodiment, data from at least an aeronautic excursion parameter may be added to one or more databases as described above in reference to FIG. 2, and/or to corpus of aeronautic excursion data 108 and/or training sets incorporated therein. At least an aeronautic excursion parameter may be received a single time or may be updated via periodic and/or streamed receipt of additional data via airport data feed 128, operator data feed 124, weather data feed 132, or the like.

In an embodiment, and still referring to FIG. 1, at least an aeronautic excursion parameter of a future aeronautic excursion may include a freight request; as used in this disclosure, a freight request is an element of data assigning at least an item of non-sapient payload that is not associated with a person of sapient payload to storage space in an aircraft that is undertraining the future aeronautic excursion. In other words, a freight request assigns at least an item of non-sapient payload that is not at least an item of luggage, carry-on luggage, or personal effects of a passenger; such an item may be a part of shipment of goods or materials to be transported using the aircraft during the future aeronautic excursion. In an embodiment, a user or entity may enter a freight request via a graphical user interface 140; for instance, a user may have an item of non-sapient payload that user wishes to convey from a first geographical location to a second geographical location. Continuing the above non-limiting example, user may locate, in a graphical user interface 140 operating on at least a server 104, one or more aeronautic excursions that are scheduled to occur from the first geographical location to the second geographical location; at least a server 104 may, as a non-limiting example, display such geographical excursions using data acquired from at least an aeronautic excursion parameter as described above. Graphical user interface 140 may enable users to search for aeronautic excursions by date, time, origin, and/or destination; persons skilled in the art, upon viewing the entirety of this disclosure, will be aware of various ways in which graphical user interface 140 may permit a user to search and/or browse through at least an aeronautic excursion parameter to locate a desired aeronautic excursion. In an embodiment, graphical user interface 140 may display a current non-sapient payload capacity, which may represent an amount of storage space and/or weight available on an aircraft undertaking a given aeronautic excursion; non-sapient payload capacity may be determined as described in further detail below. Non-sapient payload capacity may include a volume of space available in a particular compartment of an aircraft, such as a luggage compartment; available dimensions of a luggage compartment, and/or of space therein, may also be included.

In an embodiment, and continuing to refer to FIG. 1, a user may enter a volume and/or weight of non-sapient payload that the user wishes to send; this may be entered, without limitation, using fields such as drop-down lists or text fields, which may include elements prepopulating fields with a range of permissible values based on current non-sapient payload capacity, and/or event handlers and/or scripts that enforce limits based on current non-sapient payload capacity. Where at least a freight request is entered, the at least a freight request may be combined with other data of at least an aeronautic excursion parameter; in other words subsequent and/or iterative determinations of current non-sapient payload capacity may account for any entered freight requests, which may represent an additional limit on available volume and/or weight for more sapient and/or non-sapient payload elements.

Still referring to FIG. 1, system 100 includes a capacity estimation artificial intelligence module 144 operating on the at least a server 104. Capacity estimation artificial intelligence module 144 may include any suitable hardware or software module. Capacity estimation artificial intelligence module 144 is designed and configured to generate an excess non-sapient payload storage estimation as a function of the corpus of aeronautic excursion data 108 and the at least an aeronautic excursion parameter. Capacity estimation artificial intelligence module 144 may include one or more learners which engage in machine learning, deep learning, or similar algorithms to develop models and/or heuristics usable to generate excess non-sapient storage estimation, which may include one or more calculations usable to determine current non-sapient payload capacity as defined above. In the following exemplary illustrations, one or more such learners are described for exemplary purposes only;

one or more learners as descried above may be combined in a single module with one or more other learners and/or used to produce a combined model with one or more other learners. A given learner may be instantiated by any hardware and/or software instructions producing functionality ascribed to the learner as described below, whether in a discrete module or in a module combining some or all of such functionality with other functionality described herein or compatible therewith. Persons skilled in the art, upon reviewing the entirety of this disclosure, will be aware of various alternative approaches to instantiating the below-described learners and/or functionality thereof, as dictated by various stylistic and/or practical choices, benefits, and/or constraints.

In an embodiment, capacity estimation artificial intelligence module 144 may include, in the sense described above, a weight capacity learner 148, the weight capacity learner 148 designed and configured to determine a non-sapient payload weight capacity a function of the corpus of aeronautic excursion data 108 and the at least an aeronautic excursion parameter. Weight capacity learner 148 may be designed and configured to generate outputs using machine learning processes. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 1, weight capacity learner 148 may be designed and configured to generate at least an output by creating at least a weight capacity model relating aeronautic excursion parameter data to weight capacity using the corpus of aeronautic excursion data 108 and generating the at least an output using the weight capacity model; at least a weight capacity model may include one or more models that determine a mathematical relationship between aeronautic excursion parameter data and weight capacity. Such models may include without limitation model developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 1, machine-learning algorithm used to generate weight capacity model may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tresses, AdaBoost, gradient tree boosting, and/or voting classifier methods. Machine-learning algorithms may include neural net algorithms, including convolutional neural net processes.

Still referring to FIG. 1, weight capacity learner 148 may generate a weight capacity output using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using corpus of aeronautic excursion data 108; the trained network may then be used to apply detected relationships between elements of aeronautic excursion parameter data and weight capacity.

Figure 10:
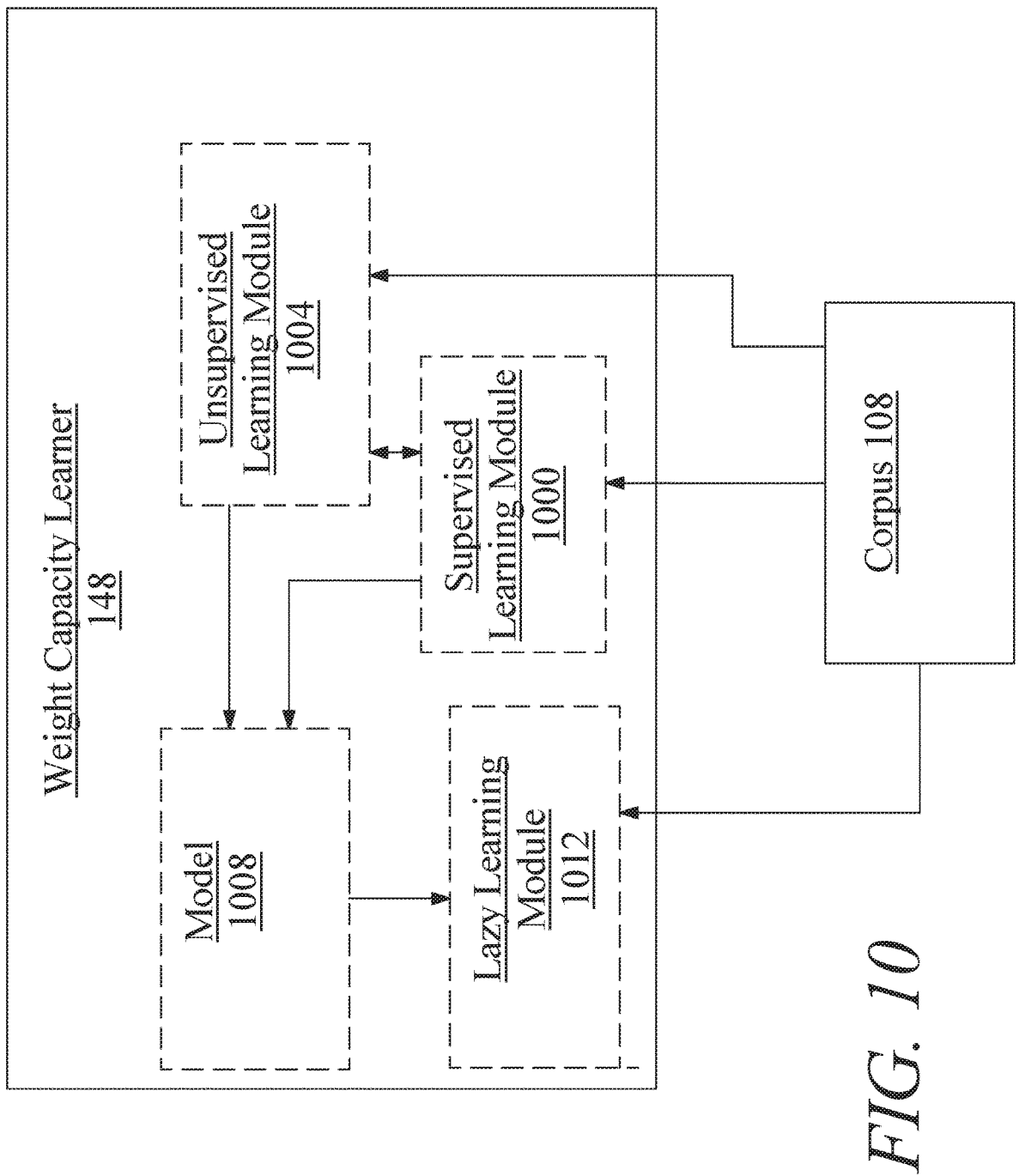
FIG. 10 is a block diagram of an exemplary embodiment of a weight capacity learner.

Referring now to FIG. 10, machine-learning algorithms used by weight capacity learner 148 may include supervised machine-learning algorithms, which may, as a non-limiting example be executed using a supervised learning module 1000 executing on at least a server 104 and/or on another computing device in communication with at least a server 104, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use aeronautic excursion parameters as inputs, weight capacity as outputs, and a scoring function representing a desired form of relationship to be detected between aeronautic excursion parameters and weight capacity; scoring function may, for instance, seek to maximize the probability that a given element of aeronautic excursion parameter data and/or combination of aeronautic excursion parameters is associated with a given weight capacity to minimize the probability that a given element of aeronautic excursion parameter data and/or combination of elements of aeronautic excursion parameter data is not associated with a given weight capacity. Scoring function may be expressed as a risk function representing an "expected loss" of an algorithm relating inputs to outputs, where loss is computed as an error function representing a degree to which a prediction generated by the relation is incorrect when compared to a given input-output pair provided in corpus of aeronautic excursion data 108. Persons skilled in the art, upon reviewing the entirety of this disclosure, will be aware of various possible variations of supervised machine learning algorithms that may be used to determine relation between aeronautic excursion parameters and weight capacity. In an embodiment, one or more supervised machine-learning algorithms may be restricted to a particular domain; for instance, a supervised machine-learning process may be performed with respect to a given set of parameters and/or categories of parameters that have been suspected to be related to a given set of weight capacity. Domain restrictions may be suggested by experts and/or deduced from known purposes for particular evaluations and/or known tests used to evaluate weight capacity. Additional supervised learning processes may be performed without domain restrictions to detect, for instance, previously unknown and/or unsuspected relationships between aeronautic excursion parameters and weight capacity.

Still referring to FIG. 10, machine-learning algorithms may include unsupervised processes; unsupervised processes may, as a non-limiting example, be executed by an unsupervised learning module 1004 executing on at least a server 104 and/or on another computing device in communication with at least a server 104, which may include any hardware or software module. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, weight capacity learner 148 and/or at least a server 104 may perform an unsupervised machine learning process on corpus of aeronautic excursion data 108, which may cluster data of corpus of aeronautic excursion data 108 according to detected relationships between elements of the corpus of aeronautic excursion data 108, including without limitation correlations of elements of aeronautic excursion parameter data to each other and correlations of weight capacity data to each other; such relations may then be combined with supervised machine learning results to add new criteria for weight capacity learner 148 to apply in relating aeronautic excursion parameter data to weight capacity. Continuing the example a close correlation between first element of aeronautic excursion parameter data and second element of aeronautic excursion parameter data may indicate that the second element is also a good predictor for the weight capacity; second element may be included in a new supervised process to derive a relationship or may be used as a synonym or proxy for the first aeronautic excursion parameter by weight capacity learner 148.

Still referring to FIG. 10, at least a server 104 and/or weight capacity learner 148 may detect further significant categories of aeronautic parameters, relationships of such categories to weight capacity, and/or categories of weight capacity using machine-learning processes, including without limitation unsupervised machine-learning processes as described above. In an embodiment, as additional data is added to system 100, weight capacity learner 148 and/or at least a server 104 may continuously or iteratively perform unsupervised machine-learning processes to detect relationships between different elements of the added and/or overall data; in an embodiment, this may enable system 100 to use detected relationships to discover new correlations between aeronautic excursion parameters and weight capacity. Use of unsupervised learning may greatly enhance the accuracy and detail with which system may estimate weight capacity.

Still referring to FIG. 10, weight capacity learner 148 may produce a machine-learning model 1008; alternatively or additionally weight capacity learner 148 may be designed and configured to generate at least an output by executing a lazy learning process as a function of the corpus of aeronautic excursion data 108 and the at least a physiological test sample; lazy learning processes may be performed by a lazy learning module 1012 executing on at least a server 104 and/or on another computing device in communication with at least a server 104, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" or heuristic of weight capacity associated with at least an aeronautic excursion parameter, using corpus of aeronautic excursion data 108. Heuristic may include selecting some number of highest-ranking associations and/or weight capacity. Weight capacity learner 148 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure.

In an embodiment, and still referring to FIG. 10, weight capacity learner 148 may operate by determining a current weight limit for an aeronautic excursion; current weight limit may be based on a fuel use datum representing a likely rate or total volume of fuel use on the aeronautic excursion based on current overall weight of the aircraft, as determined using aircraft data, an estimated weight of sapient payload, and an estimated weight of non-sapient payload. Each of these estimates may be calculated using any machine-learning algorithm as described above, in combination with training sets as described above. For instance, and without limitation, a training set correlating at least an aeronautic excursion parameter to a sapient payload weight datum may be used to determine an estimated sapient payload weight, by generating a machine-learning model such as a weight-capacity model and/or via a lazy learning process as described above; this may be performed, in addition, by combination with machine-learning processes estimating a likely enumeration of sapient payload using sapient payload enumeration entries correlating at least an aeronautic excursion parameter datum to a sapient payload enumeration on an aeronautic excursion. As a further example, a training set correlating at least an aeronautic excursion parameter to a non-sapient payload weight datum may be used to determine an estimated non-sapient payload weight, by generating a machine-learning model such as a weight-capacity model and/or via a lazy learning process as described above. Calculation of non-sapient weight capacity may be performed by comparison of two or more of the above-described values, including by subtraction of current overall weight from an overall weight capacity derived as described above to determine what excess weight capacity remains. One or more buffer amounts may be included in determination of excess non-sapient weight capacity; for instance, an error function as described above may indicate a degree of uncertainty in predicting non-sapient weight capacity, and calculation of non-sapient weight capacity may be performed by subtracting from the estimated non-sapient weight capacity an amount of weight equal or proportional to the degree of uncertainty as described above.

Referring again to FIG. 1, capacity estimation artificial intelligence module 144 may include a volume capacity learner 152, the volume capacity learner 152 designed and configured to determine a non-sapient payload volume capacity a function of the corpus of aeronautic excursion data 108 and the at least an aeronautic excursion parameter; this may be accomplished using any machine-learning algorithms as described above regarding weight capacity learner 148, or any combination thereof. As a nonlimiting example, volume capacity learner 152 may operate, without limitation, using non-sapient payload volume entries as described above in combination with machine-learning processes to generate an estimated non-sapient payload volume capacity using the at least an aeronautic excursion parameter.

Figure 11:
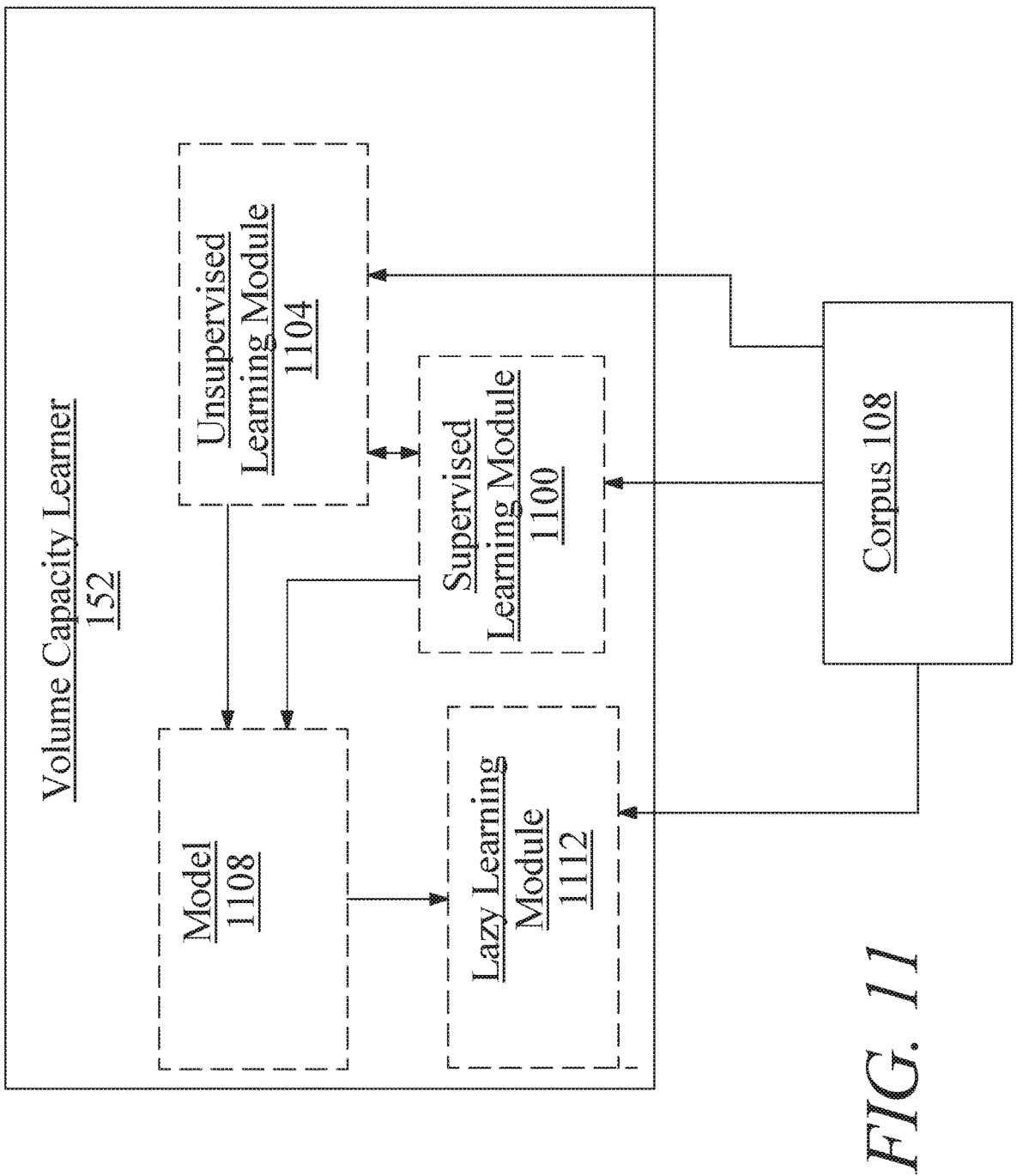
FIG. 11 is a block diagram of an exemplary embodiment of a volume capacity learner.

Referring now to FIG. 11, machine-learning algorithms used by volume capacity learner 152 may include supervised machine-learning algorithms, which may, as a non-limiting example be executed using a supervised learning module 1100 executing on at least a server 104 and/or on another computing device in communication with at least a server 104, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use aeronautic excursion parameters as inputs, volume capacity as outputs, and a scoring function representing a desired form of relationship to be detected between aeronautic excursion parameters and volume capacity; scoring function may, for instance, seek to maximize the probability that a given element of aeronautic excursion parameter data and/or combination of aeronautic excursion parameters is associated with a given volume capacity to minimize the probability that a given element of aeronautic excursion parameter data and/or combination of elements of aeronautic excursion parameter data is not associated with a given volume capacity. Scoring function may be expressed as a risk function representing an "expected loss" of an algorithm relating inputs to outputs, where loss is computed as an error function representing a degree to which a prediction generated by the relation is incorrect when compared to a given input-output pair provided in corpus of aeronautic excursion data 108. Persons skilled in the art, upon reviewing the entirety of this disclosure, will be aware of various possible variations of supervised machine learning algorithms that may be used to determine relation between aeronautic excursion parameters and volume capacity. In an embodiment, one or more supervised machine-learning algorithms may be restricted to a particular domain; for instance, a supervised machine-learning process may be performed with respect to a given set of parameters and/or categories of parameters that have been suspected to be related to a given set of volume capacity. Domain restrictions may be suggested by experts and/or deduced from known purposes for particular evaluations and/or known tests used to evaluate volume capacity. Additional supervised learning processes may be performed without domain restrictions to detect, for instance, previously unknown and/or unsuspected relationships between aeronautic excursion parameters and volume capacity.

Still referring to FIG. 11, machine-learning algorithms may include unsupervised processes; unsupervised processes may, as a non-limiting example, be executed by an unsupervised learning module 1104 executing on at least a server 104 and/or on another computing device in communication with at least a server 104, which may include any hardware or software module. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, volume capacity learner 152 and/or at least a server 104 may perform an unsupervised machine learning process on corpus of aeronautic excursion data 108, which may cluster data of corpus of aeronautic excursion data 108 according to detected relationships between elements of the corpus of aeronautic excursion data 108, including without limitation correlations of elements of aeronautic excursion parameter data to each other and correlations of volume capacity data to each other; such relations may then be combined with supervised machine learning results to add new criteria for volume capacity learner 152 to apply in relating aeronautic excursion parameter data to volume capacity. Continuing the example a close correlation between first element of aeronautic excursion parameter data and second element of aeronautic excursion parameter data may indicate that the second element is also a good predictor for the volume capacity; second element may be included in a new supervised process to derive a relationship or may be used as a synonym or proxy for the first aeronautic excursion parameter by volume capacity learner 152.

Still referring to FIG. 11, at least a server 104 and/or volume capacity learner 152 may detect further significant categories of aeronautic parameters, relationships of such categories to volume capacity, and/or categories of volume capacity using machine-learning processes, including without limitation unsupervised machine-learning processes as described above. In an embodiment, as additional data is added to system 100, volume capacity learner 152 and/or at least a server 104 may continuously or iteratively perform unsupervised machine-learning processes to detect relationships between different elements of the added and/or overall data; in an embodiment, this may enable system 110 to use detected relationships to discover new correlations between aeronautic excursion parameters and volume capacity. Use of unsupervised learning may greatly enhance the accuracy and detail with which system may estimate volume capacity.

Still referring to FIG. 11, volume capacity learner 152 may produce a machine-learning model 1108; alternatively or additionally volume capacity learner 152 may alternatively or additionally be designed and configured to generate at least an output by executing a lazy learning process as a function of the corpus of aeronautic excursion data 108 and the at least a physiological test sample; lazy learning processes may be performed by a lazy learning module 1112 executing on at least a server 104 and/or on another computing device in communication with at least a server 104, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" or heuristic of volume capacity associated with at least an aeronautic excursion parameter, using corpus of aeronautic excursion data 108. Heuristic may include selecting some number of highest-ranking associations and/or volume capacity. Volume capacity learner 152 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure.

With continued reference to FIG. 11, volume capacity learner 152 may operate by determining a current volume limit for an aeronautic excursion; current volume limit may be based on current overall volume in the aircraft and/or in one or more storage compartments thereof, as determined using aircraft data and an estimated volume of non-sapient payload. Estimates may be calculated using any machine-learning algorithm as described above, in combination with training sets as described above. For instance, and without limitation, a training set correlating at least an aeronautic excursion parameter to a non-sapient payload volume datum may be used to determine an estimated non-sapient payload volume, by generating a machine-learning model such as a volume-capacity model and/or via a lazy learning process as described above. Calculation of non-sapient volume capacity may be performed by comparison of two or more of the above-described values, including by subtraction of current overall volume from an overall volume capacity derived as described above to determine what excess volume capacity remains. One or more buffer amounts may be included in determination of excess non-sapient volume capacity; for instance, an error function as described above may indicate a degree of uncertainty in predicting non-sapient volume capacity, and calculation of non-sapient volume capacity may be performed by subtracting from the estimated non-sapient volume capacity an amount of volume equal or proportional to the degree of uncertainty as described above.

Referring again to FIG. 1, capacity estimation artificial intelligence module 144 may include a sapient payload estimator 156, the sapient payload estimator 156 designed and configured to determine a sapient payload as a function of the corpus of aeronautic excursion data 108 and the at least an aeronautic excursion parameter; this may be accomplished using any machine-learning algorithms as described above regarding weight capacity learner 148, or any combination thereof. For instance, and without limitation, sapient payload estimator 156 may perform one or more machine-learning algorithms using training data containing at least a sapient payload enumeration entry of the plurality of sapient payload enumeration entries correlating at least an aeronautic excursion parameter datum to a sapient payload enumeration on an aeronautic excursion as described above.

Figure 12:
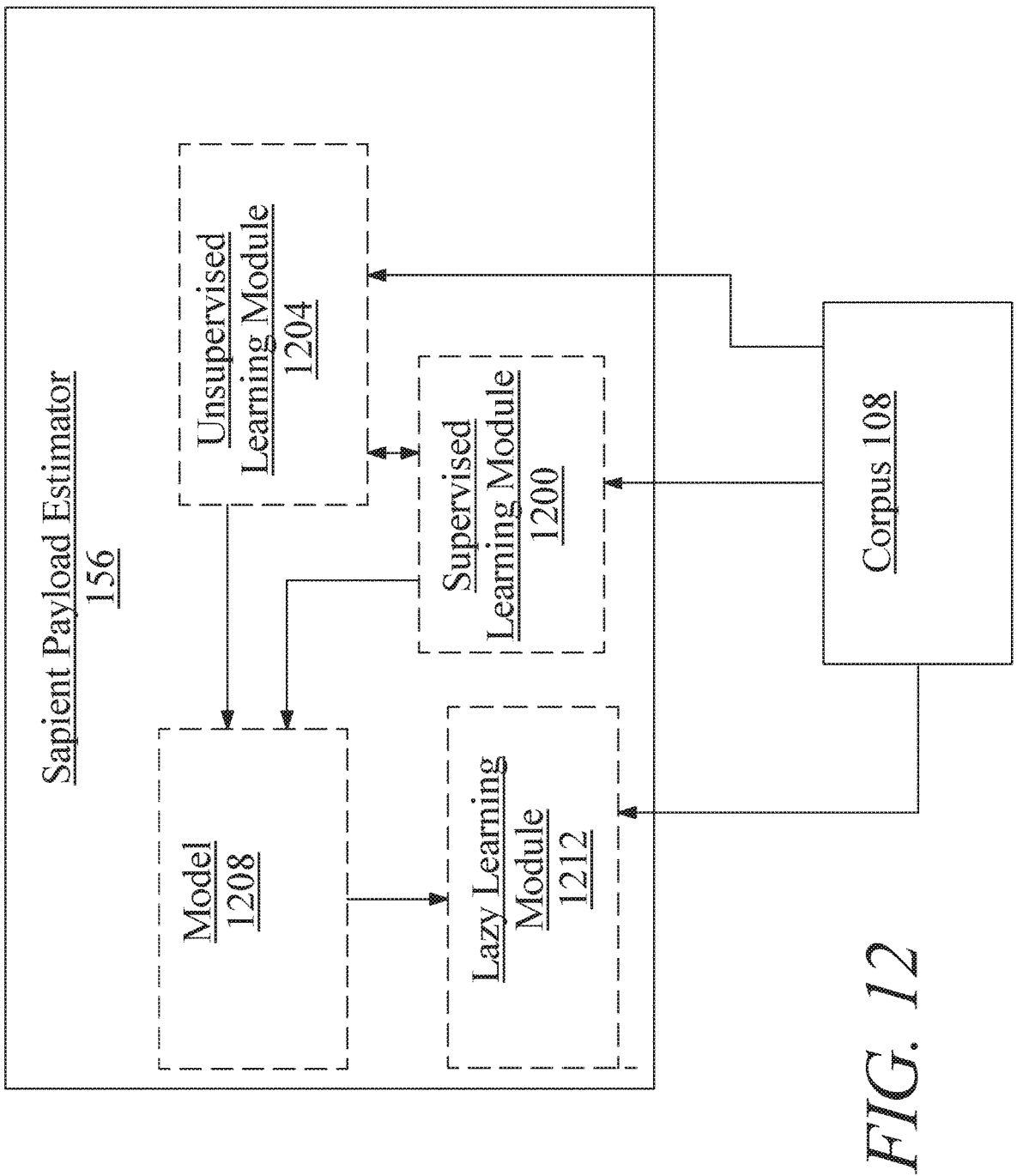
FIG. 12 is a block diagram of an exemplary embodiment of a sapient payload estimator.

Referring now to FIG. 12, machine-learning algorithms used by sapient payload estimator 156 may include supervised machine-learning algorithms, which may, as a non-limiting example be executed using a supervised learning module 1200 executing on at least a server 104 and/or on another computing device in communication with at least a server 104, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use aeronautic excursion parameters as inputs, sapient payload and/or sapient payload enumerations as outputs, and a scoring function representing a desired form of relationship to be detected between aeronautic excursion parameters and sapient payloads and/or enumerations; scoring function may, for instance, seek to maximize the probability that a given element of aeronautic excursion parameter data and/or combination of aeronautic excursion parameters is associated with a given sapient payload and/or enumeration, and/or to minimize the probability that a given element of aeronautic excursion parameter data and/or combination of elements of aeronautic excursion parameter data is not associated with a given sapient payload and/or enumeration. Scoring function may be expressed as a risk function representing an "expected loss" of an algorithm relating inputs to outputs, where loss is computed as an error function representing a degree to which a prediction generated by the relation is incorrect when compared to a given input-output pair provided in corpus of aeronautic excursion data 108. Persons skilled in the art, upon reviewing the entirety of this disclosure, will be aware of various possible variations of supervised machine learning algorithms that may be used to determine relation between aeronautic excursion parameters and sapient payloads and/or enumerations. In an embodiment, one or more supervised machine-learning algorithms may be restricted to a particular domain; for instance, a supervised machine-learning process may be performed with respect to a given set of parameters and/or categories of parameters that have been suspected to be related to a given set of sapient payloads and/or enumerations. Additional supervised learning processes may be performed without domain restrictions to detect, for instance, previously unknown and/or unsuspected relationships between aeronautic excursion parameters and sapient payloads and/or enumerations.

Still referring to FIG. 12, machine-learning algorithms may include unsupervised processes; unsupervised processes may, as a non-limiting example, be executed by an unsupervised learning module 1204 executing on at least a server 104 and/or on another computing device in communication with at least a server 104, which may include any hardware or software module. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, sapient payload estimator 156 and/or at least a server 104 may perform an unsupervised machine learning process on corpus of aeronautic excursion data 108, which may cluster data of corpus of aeronautic excursion data 108 according to detected relationships between elements of the corpus of aeronautic excursion data 108, including without limitation correlations of elements of aeronautic excursion parameter data to each other and correlations of sapient payload data to each other; such relations may then be combined with supervised machine learning results to add new criteria for sapient payload estimator 156 to apply in relating aeronautic excursion parameter data to sapient payloads and/or enumerations. Continuing the example a close correlation between first element of aeronautic excursion parameter data and second element of aeronautic excursion parameter data may indicate that the second element is also a good predictor for a sapient payload and/or enumeration; second element may be included in a new supervised process to derive a relationship or may be used as a synonym or proxy for the first aeronautic excursion parameter by sapient payload estimator 156.

Still referring to FIG. 12, at least a server 104 and/or sapient payload estimator 156 may detect further significant categories of aeronautic parameters, relationships of such categories to sapient payloads and/or enumerations, and/or categories of sapient payloads and/or enumerations using machine-learning processes, including without limitation unsupervised machine-learning processes as described above. In an embodiment, as additional data is added to system 100, sapient payload estimator 156 and/or at least a server 104 may continuously or iteratively perform unsupervised machine-learning processes to detect relationships between different elements of the added and/or overall data; in an embodiment, this may enable system 100 to use detected relationships to discover new correlations between aeronautic excursion parameters and sapient payload. Use of unsupervised learning may greatly enhance the accuracy and detail with which system may estimate sapient payload.

Still referring to FIG. 12, sapient payload estimator 156 may produce a machine-learning model 1208; alternatively or additionally sapient payload estimator 156 may alternatively or additionally be designed and configured to generate at least an output by executing a lazy learning process as a function of the corpus of aeronautic excursion data 108 and the at least a physiological test sample; lazy learning processes may be performed by a lazy learning module 1212 executing on at least a server 104 and/or on another computing device in communication with at least a server 104, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" or heuristic of sapient payload associated with at least an aeronautic excursion parameter, using corpus of aeronautic excursion data 108. Heuristic may include selecting some number of highest-ranking associations and/or sapient payload. Sapient payload estimator 156 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Referring again to FIG. 1, capacity estimation artificial intelligence may include a fuel use learner 160 configured to relate at least an aeronautic excursion parameter datum to a fuel use datum as a function of the corpus of aeronautic excursion data 108; this may be accomplished using any machine-learning algorithms as described above regarding weight capacity learner 148, or any combination thereof. For instance, and without limitation, fuel user learner may perform one or more machine-learning algorithms using training data containing a plurality of fuel use entries, each fuel use entry of the plurality of fuel use entries correlating at least an aeronautic excursion parameter datum to a fuel use datum.

Figure 13:
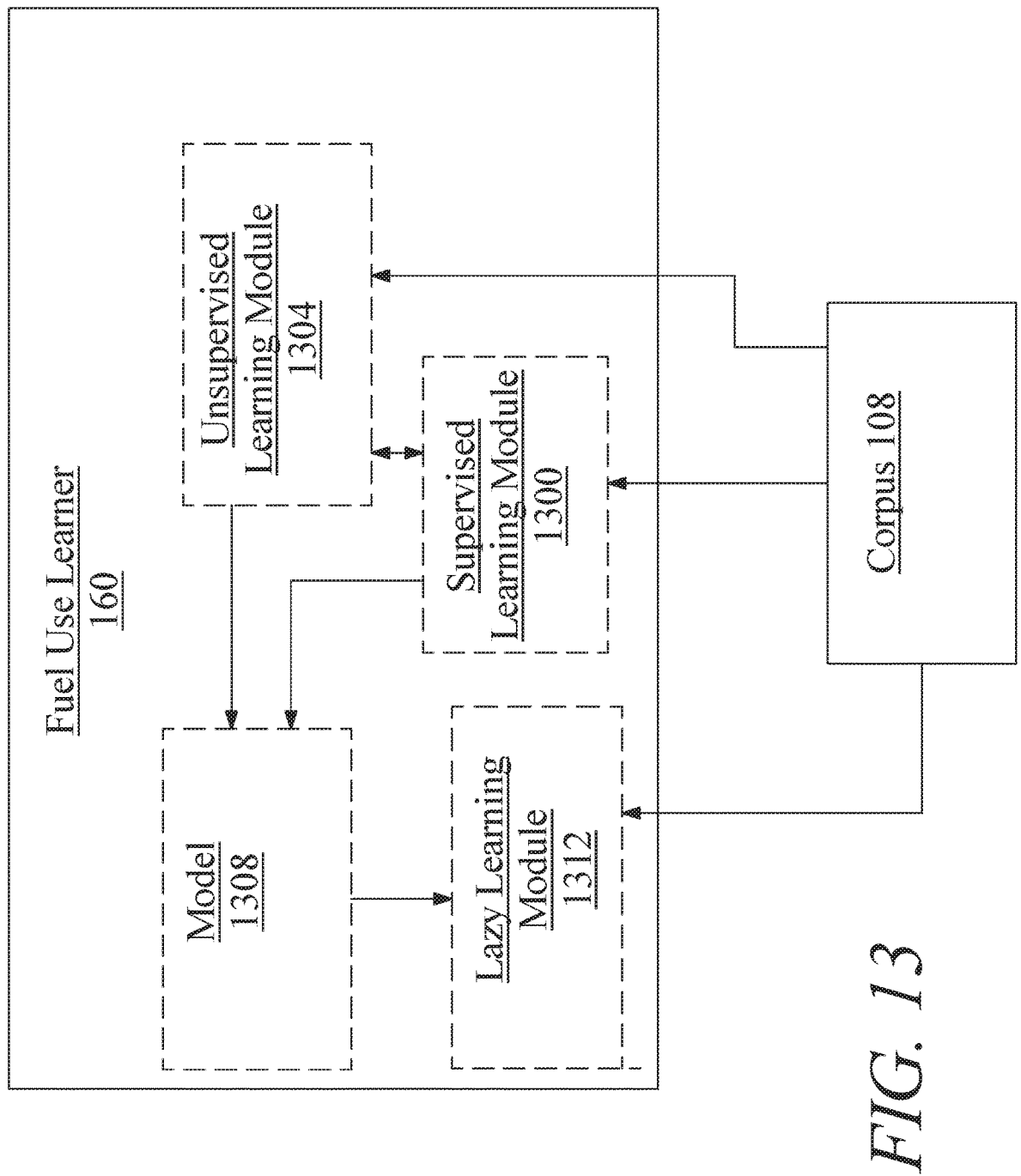
FIG. 13 is a block diagram of an exemplary embodiment of a fuel use learner.

Referring now to FIG. 13, machine-learning algorithms used by fuel use learner 160 may include supervised machine-learning algorithms, which may, as a non-limiting example be executed using a supervised learning module 1300 executing on at least a server 104 and/or on another computing device in communication with at least a server 104, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use aeronautic excursion parameters as inputs, fuel use data as outputs, and a scoring function representing a desired form of relationship to be detected between aeronautic excursion parameters and fuel use; scoring function may, for instance, seek to maximize the probability that a given element of aeronautic excursion parameter data and/or combination of aeronautic excursion parameters is associated with a given rate or overall volume of fuel use to minimize the probability that a given element of aeronautic excursion parameter data and/or combination of elements of aeronautic excursion parameter data is not associated with a given rate or volume of fuel use. Scoring function may be expressed as a risk function representing an "expected loss" of an algorithm relating inputs to outputs, where loss is computed as an error function representing a degree to which a prediction generated by the relation is incorrect when compared to a given input-output pair provided in corpus of aeronautic excursion data 108. Persons skilled in the art, upon reviewing the entirety of this disclosure, will be aware of various possible variations of supervised machine learning algorithms that may be used to determine relation between aeronautic excursion parameters and fuel use data. In an embodiment, one or more supervised machine-learning algorithms may be restricted to a particular domain; for instance, a supervised machine-learning process may be performed with respect to a given set of parameters and/or categories of parameters that have been suspected to be related to a given set of fuel use. Additional supervised learning processes may be performed without domain restrictions to detect, for instance, previously unknown and/or unsuspected relationships between aeronautic excursion parameters and fuel use data.

Still referring to FIG. 13, machine-learning algorithms may include unsupervised processes; unsupervised processes may, as a non-limiting example, be executed by an unsupervised learning module 1304 executing on at least a server 104 and/or on another computing device in communication with at least a server 104, which may include any hardware or software module. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, fuel use learner 160 and/or at least a server 104 may perform an unsupervised machine learning process on corpus of aeronautic excursion data 108, which may cluster data of corpus of aeronautic excursion data 108 according to detected relationships between elements of the corpus of aeronautic excursion data 108, including without limitation correlations of elements of aeronautic excursion parameter data to each other and correlations of fuel use data to each other; such relations may then be combined with supervised machine learning results to add new criteria for fuel use learner 160 to apply in relating aeronautic excursion parameter data to fuel use data. Continuing the example a close correlation between first element of aeronautic excursion parameter data and second element of aeronautic excursion parameter data may indicate that the second element is also a good predictor for the fuel use; second element may be included in a new supervised process to derive a relationship or may be used as a synonym or proxy for the first aeronautic excursion parameter by fuel use learner 160.

Still referring to FIG. 13, at least a server 104 and/or fuel use learner 160 may detect further significant categories of aeronautic parameters, relationships of such categories to fuel use data, and/or categories of fuel use data using machine-learning processes, including without limitation unsupervised machine-learning processes as described above. In an embodiment, as additional data is added to system 100, fuel use learner 160 and/or at least a server 104 may continuously or iteratively perform unsupervised machine-learning processes to detect relationships between different elements of the added and/or overall data; in an embodiment, this may enable system 100 to use detected relationships to discover new correlations between aeronautic excursion parameters and fuel use data. Use of unsupervised learning may greatly enhance the accuracy and detail with which system may estimate fuel use data.

Still referring to FIG. 13, fuel use learner 160 may produce a machine-learning model 1308; alternatively or additionally fuel use learner 160 may alternatively or additionally be designed and configured to generate at least an output by executing a lazy learning process as a function of the corpus of aeronautic excursion data 108 and the at least a physiological test sample; lazy learning processes may be performed by a lazy learning module 1312 executing on at least a server 104 and/or on another computing device in communication with at least a server 104, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" or heuristic of fuel use associated with at least an aeronautic excursion parameter, using corpus of aeronautic excursion data 108. Heuristic may include selecting some number of highest-ranking associations and/or fuel use. Fuel use learner 160 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Referring again to FIG. 1, at least a server 104 may be designed and/or configured to output an excess non-sapient payload storage estimation based on the at least an aeronautic excursion parameter. Outputting an excess non-sapient payload storage estimation may include, without limitation directly providing the excess non-sapient payload storage estimation to a user and/or remote device (not shown); provision to a user may be accomplished, without limitation, via a graphical user interface 140 as described above. Outputting an excess non-sapient payload storage estimation may also be performed by using the excess non-sapient payload storage estimation to enforce limits on permitted and/or accepted freight requests as described above.

Figure 14:
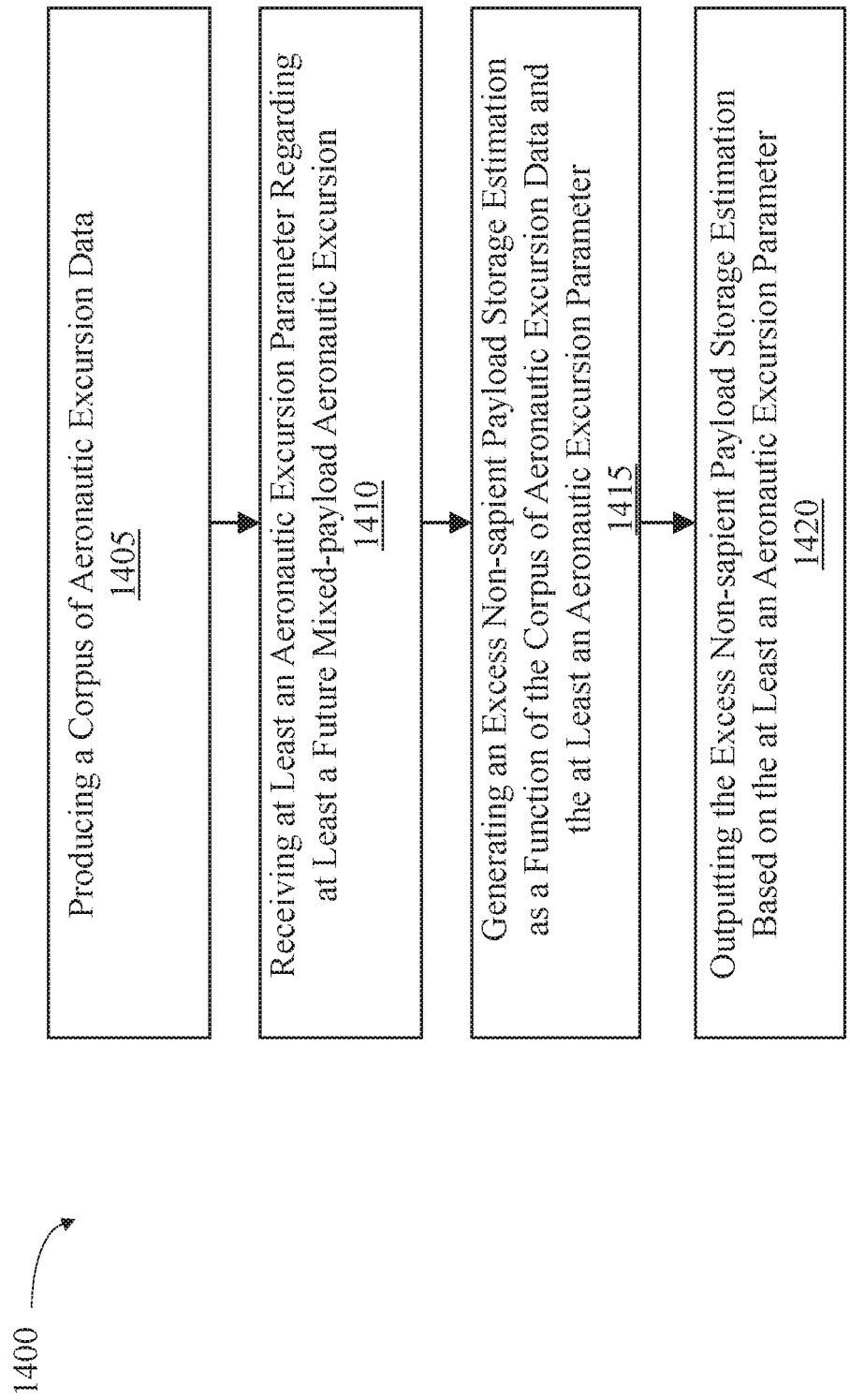
FIG. 14 is a flow chart illustrating an exemplary embodiment of an artificial intelligence method of estimating excess non-sapient payload capacity on mixed-payload aeronautic excursions.

Referring now to FIG. 14, an exemplary embodiment of an artificial intelligence method 1400 of estimating excess non-sapient payload capacity on mixed-payload aeronautic excursions is illustrated. At step 1405, at least a server 104 produces a corpus of mixed payload aeronautic excursion data including a plurality of aeronautic excursion data entries, where each aeronautic excursion data entry 112 correlates at least a first aeronautic excursion parameter datum 116 and at least a second aeronautic excursion parameter datum 120; this may be accomplished, without limitation, as described above in reference to FIGS. 1-13. As a non-limiting example, producing corpus of aeronautic excursion data 108 may include producing a plurality of sapient payload-to-weight entries, each sapient payload-to-weight entry of the plurality of sapient payload-to-weight entries correlating at least an aeronautic excursion parameter datum to a sapient payload weight datum, for instance as described above in reference to FIGS. 1-13. As a further non-limiting example, producing the corpus of aeronautic excursion data 108 may include producing a plurality of sapient payload enumeration entries, each sapient payload enumeration entry of the plurality of sapient payload enumeration entries correlating at least an aeronautic excursion parameter datum to a sapient payload enumeration on an aeronautic excursion, for instance as described above in reference to FIGS. 1-13. As an additional non-limiting example, producing corpus of aeronautic excursion data 108 may include producing a plurality of sapient payload-to-weight entries, each sapient payload-to-weight entry of the plurality of non-sapient payload-to-weight entries correlating at least an aeronautic excursion parameter datum to a non-sapient payload weight datum, for instance as described above in reference to FIGS. 1-13. As another example, producing corpus of aeronautic excursion data 108 may include producing a plurality of non-sapient payload volume entries, each non-sapient volume entry of the plurality of sapient payload-to-weight entries correlating at least an aeronautic excursion parameter datum to non-sapient payload volume datum, for instance as described above in reference to FIGS. 1-13. As a further non-limiting example, producing corpus of aeronautic excursion data 108 may include producing a plurality of fuel use entries, each fuel use entry of the plurality of fuel use entries correlating at least an aeronautic excursion parameter datum to a fuel use datum, for instance as described above in reference to FIGS. 1-13.

At step 1410, and still referring to FIG. 14, at least a server 104 receives at least an aeronautic excursion parameter regarding at least a future aeronautic excursion. This may be accomplished, without limitation, as described above in reference to FIGS. 1-13; for instance, and without limitation, receiving at least an aeronautic excursion parameter may include receiving the at least an aeronautic excursion parameter from an aeronautic vehicle operator, which may be accomplished via an operator data feed 124 as described above. As a further non-limiting example, receiving at least an aeronautic excursion parameter from an airport, which may be accomplished via an airport data feed 128 as described above. As an additional non-limiting example, receiving at least an aeronautic excursion parameter may include receiving the at least an aeronautic excursion parameter from a weather forecasting apparatus, such as via a weather data feed 132 as described above. As a further non-limiting example, receiving at least an aeronautic excursion parameter may include receiving at least a freight-use request; this may be accomplished as described above in reference to FIGS. 1-13, including without limitation via a graphical user interface 140.

At step 1415, and continuing to refer to FIG. 14, a capacity estimation artificial intelligence module 144 operating on the at least a server 104 generates an excess non-sapient payload storage estimation as a function of the corpus of aeronautic excursion data 108 and the at least an aeronautic excursion parameter; this may be accomplished, without limitation, as described above in reference to FIGS. 1-13. For instance and without limitation, where at least a server 104 receives at least a freight-use request, generating excess non-sapient payload storage estimation may include modifying the at least an excess non-sapient payload storage estimation based on the freight-use request.

Still referring to FIG. 14, in an embodiment, at least a future aeronautic excursion may include a first excursion section from a first airport to a second airport and a second excursion section from a second airport to a third airport; for instance, and without limitation, at least a future aeronautic excursion may have a first "leg" to a first destination outputting the at least an excess non-sapient payload storage estimation further comprises outputting a first estimation for the first excursion section and a second estimation for the second excursion section. Capacity estimation artificial intelligence module 144 may generate each excess non-sapient payload storage estimation for each excursion section using any method or method steps as described above for generation of an excess non-sapient payload storage estimation.

At step 1420, and still referring to FIG. 14, at least a server 104 outputs at least an excess non-sapient payload storage estimation based on the at least an aeronautic excursion parameter; this may be implemented as described above in reference to FIGS. 1-13. In an embodiment, at least a server 104 receives at least a freight-use request and modifies the at least an excess non-sapient payload storage estimation based on the freight-use request; this may be implemented as described above in reference to FIGS. 1-13. As a non-limiting example, where the at least a future aeronautic excursion further includes a first excursion section from a first airport to a second airport and a second excursion section from a second airport to a third airport, outputting the at least an excess non-sapient payload storage estimation may include outputting a first estimation for the first excursion section and a second estimation for the second excursion section; at least a freight-use request may include a first freight-use request corresponding to the first excursion section and a second freight-use request corresponding to the second excursion section, where each of the first freight-use request and the second freight-use request may be entered and/or processed as described above for entering a freight-use request. As a further non-limiting example, where receiving the at least an aeronautic excursion parameter regarding at least a future aeronautic excursion further includes receiving at least a first aeronautic excursion parameter regarding at least a first future aeronautic excursion and receiving at least a second aeronautic excursion parameter regarding at least a second future aeronautic excursion, outputting the at least an excess non-sapient payload storage estimation may include outputting at least a first excess non-sapient payload storage estimation as a function of the at least a first aeronautic excursion parameter and outputting at least a second excess non-sapient payload estimation as a function of the at least a second aeronautic excursion parameter; at least a server 104 may receive at least a freight-use request including at least a first freight-use request for the at least a first future aeronautic excursion and at least a second freight-use request for the at least a second future aeronautic excursion.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 15:
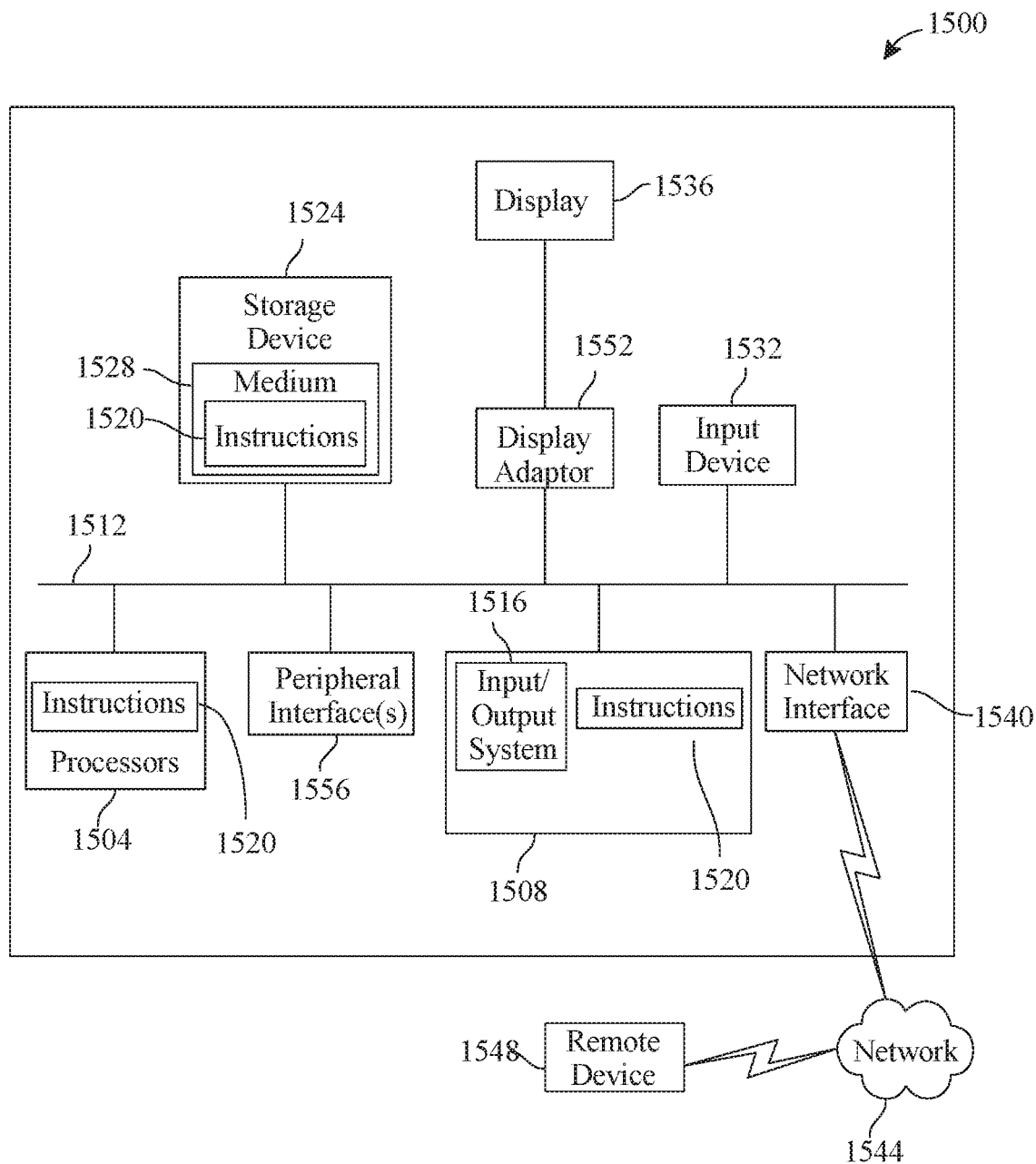
FIG. 15 is a block diagram of a computing system that can be used to implement any one or more of the methodologies disclosed herein and any one or more portions thereof.

FIG. 15 shows a diagrammatic representation of one embodiment of a computing device in the exemplary form of a computer system 1500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Memory 1508 may include various components (e.g., machine-readable media) including, but not limited to, a random-access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An artificial intelligence system for estimating excess non-sapient payload capacity on mixed-payload aeronautic excursions, the system including:
    at least one server, the at least one server designed and configured to:
        produce a corpus of aeronautic excursion data, wherein the corpus of aeronautic excursion data further comprises training data, the training data including a plurality of aeronautic excursion data entries, wherein each aeronautic excursion data entry contains at least one first aeronautic excursion parameter datum and at least one second aeronautic excursion parameter datum, wherein the at least one first aeronautic excursion parameter datum is correlated to the at least one second aeronautic excursion parameter datum;
        receive at least one aeronautic excursion parameter regarding a future mixed-payload aeronautic excursion; and
        output an excess non-sapient payload storage estimation based on the at least one aeronautic excursion parameter; and
    a capacity estimation artificial intelligence module operating on the at least one server, the capacity estimation artificial intelligence module designed and configured to generate the excess non-sapient payload storage estimation as a function of the corpus of aeronautic excursion data and the at least one aeronautic excursion parameter, wherein generation further comprises:
        estimating a sapient payload weight based on the at least one aeronautic excursion parameter, wherein estimating the sapient payload weight further comprises:
            generating a sapient payload weight machine-learning model as a function of the corpus of aeronautic excursion data, wherein the sapient payload weight machine-learning model receives aeronautic excursion data as inputs and outputs sapient payload weight;
            inputting the at least one aeronautic excursion parameter into the sapient payload weight machine-learning model; and
            outputting the estimated sapient payload weight from the sapient payload machine-learning model;
        generating, using the corpus of aeronautic excursion data, a machine-learning model relating aeronautic excursion parameter inputs to weight capacity outputs;
        storing the machine-learning model in memory of the at least one server;
        generating a weight capacity estimation by inputting the aeronautic excursion data into the machine-learning model and receiving the weight capacity estimation as an output of the machine-learning model; and
        determining the excess non-sapient payload storage estimation as a function of the estimated sapient payload weight and the estimated weight capacity.

2. The system of claim 1, wherein the capacity estimation artificial intelligence module further comprises a volume capacity learner, the volume capacity learner designed and configured to determine a non-sapient payload volume capacity as a function of the corpus of aeronautic excursion data and the at least one aeronautic excursion parameter.

3. The system of claim 1, wherein the capacity estimation artificial intelligence module is further configured to:
    determine an estimated sapient payload enumeration;
    generate a machine-learning model relating sapient payload enumerations to non-sapient payload weight;
    estimating a current non-sapient payload weight using the machine-learning model and the estimated current sapient payload enumeration; and
    determining the excess non-sapient payload storage estimation as a function of the estimated sapient payload weight, the estimated non-sapient payload weight, and the estimated weight capacity.

4. The system of claim 1 wherein the capacity estimation artificial intelligence module further comprises a fuel use learner configured to relate at least one aeronautic excursion parameter datum to a fuel use datum as a function of the corpus of aeronautic excursion data.

5. The system of claim 3, wherein determining an estimated sapient payload enumeration further comprises:
    generating a machine-learning model that inputs aeronautic excursion parameters and outputs sapient payload enumerations;
    inputting to the machine-learning model the at least an aeronautic excursion parameter; and
    outputting, from the machine-learning model, the estimated sapient payload enumeration.

6. The system of claim 1 further comprising an operator data feed operating on the at least one server, the operator data feed configured to receive, from an operator device, data regarding the future mixed-payload aeronautic excursion.

7. The system of claim 1 further comprising an airport data feed operating on the at least one server, the operator data feed configured to receive, from an airport device, data regarding the future mixed-payload aeronautic excursion.

8. The system of claim 1 further comprising a weather data feed operating on the at least one server, the weather data feed configured to receive, from a weather service, weather data.

9. An artificial intelligence method of estimating excess non-sapient payload capacity on mixed-payload aeronautic excursions, the method comprising:
    producing, by at least one server, a corpus of aeronautic excursion data including a plurality of aeronautic excursion data entries, wherein the corpus of aeronautic excursion data further comprises training data, the training data including a plurality of aeronautic excursion data entries, wherein each aeronautic excursion data entry contains at least one first aeronautic excursion parameter datum and at least one second aeronautic excursion parameter datum, wherein the at least one first aeronautic excursion parameter datum is correlated to the at least one second aeronautic excursion parameter datum;
    receiving, by the server, at least one aeronautic excursion parameter regarding at least one future mixed-payload aeronautic excursion;

generating, by a capacity estimation artificial intelligence module operating on the at least one server, an excess non-sapient payload storage estimation as a function of the corpus of aeronautic excursion data and the at least one aeronautic excursion parameter, wherein generation further comprises:
  estimating a sapient payload weight based on the at least one aeronautic excursion parameter, wherein estimating the sapient payload weight further comprises:
    generating a sapient payload weight machine-learning model as a function of the corpus of aeronautic excursion data, wherein the sapient payload weight machine-learning model receives aeronautic excursion data as inputs and outputs sapient payload weight;
    inputting the at least one aeronautic excursion parameter into the sapient payload weight machine-learning model; and
    outputting the estimated sapient payload weight from the sapient payload machine-learning model;
  generating, using the corpus of aeronautic excursion data, a machine-learning model relating aeronautic excursion parameter inputs to weight capacity outputs;
  storing the machine-learning model in memory of the at least one server;
  generating a weight capacity estimation by inputting the aeronautic excursion data into the machine-learning model and receiving the weight capacity estimation as an output of the machine-learning model; and
  determining the excess non-sapient payload storage estimation as a function of the estimated sapient payload weight and the estimated weight capacity; and
outputting, by the server, the excess non-sapient payload storage estimation based on the at least one aeronautic excursion parameter.

10. The method of claim 9, wherein producing the corpus of aeronautic excursion data further comprises producing a plurality of sapient payload-to-weight entries, each sapient payload-to-weight entry of the plurality of sapient payload-to-weight entries correlating at least one aeronautic excursion parameter datum to a sapient payload weight datum.

11. The method of claim 9, wherein producing the corpus of aeronautic excursion data further comprises producing a plurality of sapient payload enumeration entries, each sapient payload enumeration entry of the plurality of sapient payload enumeration entries correlating at least one aeronautic excursion parameter datum to a sapient payload enumeration on an aeronautic excursion.

12. The method of claim 9, wherein producing the corpus of aeronautic excursion data further comprises producing a plurality of sapient payload-to-weight entries, each sapient payload-to-weight entry of the plurality of non-sapient payload-to-weight entries correlating at least one aeronautic excursion parameter datum to a non-sapient payload weight datum.

13. The method of claim 9, wherein producing the corpus of aeronautic excursion data further comprises producing a plurality of non-sapient payload volume entries, each non-sapient volume entry of the plurality of sapient payload-to-weight entries correlating at least one aeronautic excursion parameter datum to a non-sapient payload volume datum.

14. The method of claim 9, wherein producing the corpus of aeronautic excursion data further comprises producing a plurality of fuel use entries, each fuel use entry of the plurality of fuel use entries correlating at least one aeronautic excursion parameter datum to a fuel use datum.

15. The method of claim 9, wherein receiving the at least one aeronautic excursion parameter further comprises receiving the at least one aeronautic excursion parameter from an aeronautic vehicle operator.

16. The method of claim 9, wherein receiving the at least one aeronautic excursion parameter further comprises receiving the at least one aeronautic excursion parameter from a weather forecasting apparatus.

17. The method of claim 9 further comprising:
  receiving at least one freight-use request; and
  modifying the at least one excess non-sapient payload storage estimation based on the at least one freight-use request.

18. The method of claim 9 wherein the at least one future aeronautic excursion further includes a first excursion section from a first airport to a second airport and a second excursion section from a second airport to a third airport and outputting the at least one excess non-sapient payload storage estimation further comprises outputting a first estimation for the first excursion section and a second estimation for the second excursion section.

19. The method of claim 9, wherein:
  receiving the at least one aeronautic excursion parameter regarding at least one future aeronautic excursion further comprises receiving at least one first aeronautic excursion parameter regarding at least one first future aeronautic excursion and receiving at least one second aeronautic excursion parameter regarding at least one second future aeronautic excursion; and
  outputting the at least one excess non-sapient payload storage estimation further comprises outputting at least one first excess non-sapient payload storage estimation as a function of the at least one first aeronautic excursion parameter and outputting at least one second excess non-sapient payload estimation as a function of the at least one second aeronautic excursion parameter.

20. The method of claim 19 further comprising receiving at least one freight-use request, wherein the at least one freight-use request further comprises at least one first freight-use request for the at least one first future aeronautic excursion and at least one second freight-use request for the at least one second future aeronautic excursion.

* * * * *